US012443558B2

(12) United States Patent
Shanbhogue et al.

(10) Patent No.: US 12,443,558 B2
(45) Date of Patent: *Oct. 14, 2025

(54) PROCESSORS, METHODS, SYSTEMS, AND INSTRUCTIONS TO ATOMICALLY STORE TO MEMORY DATA WIDER THAN A NATIVELY SUPPORTED DATA WIDTH

(71) Applicant: Intel Corporation, Santa Clara, CA (US)

(72) Inventors: Vedvyas Shanbhogue, Austin, TX (US); Stephen J. Robinson, Austin, TX (US); Christopher D. Bryant, Austin, TX (US); Jason W. Brandt, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/670,721

(22) Filed: May 21, 2024

(65) Prior Publication Data

US 2024/0427728 A1    Dec. 26, 2024

Related U.S. Application Data

(63) Continuation of application No. 17/827,882, filed on May 30, 2022, now Pat. No. 12,007,938, which is a
(Continued)

(51) Int. Cl.
*G06F 9/30* (2018.01)
*G06F 9/38* (2018.01)
*G06F 15/80* (2006.01)

(52) U.S. Cl.
CPC ...... *G06F 15/8007* (2013.01); *G06F 9/30036* (2013.01); *G06F 9/30043* (2013.01);
(Continued)

(58) Field of Classification Search
CPC ............ G06F 9/30036; G06F 9/30043; G06F 9/30112; G06F 15/8007
See application file for complete search history.

(56) References Cited

U.S. PATENT DOCUMENTS

| 6,044,448 A | 3/2000 | Agrawal et al. |
| 6,298,436 B1 | 10/2001 | Kahle et al. |

(Continued)

FOREIGN PATENT DOCUMENTS

| CN | 1244675 A | 2/2000 |
| CN | 101203831 A | 6/2008 |

(Continued)

OTHER PUBLICATIONS

Advisory Action Office Action, U.S. Appl. No. 15/089,525, Aug. 10, 2020, 3 pages.
(Continued)

*Primary Examiner* — Jacob Petranek
(74) *Attorney, Agent, or Firm* — Nicholson De Vos Webster & Elliott LLP

(57) ABSTRACT

A processor includes a widest set of data registers that corresponds to a given logical processor. Each of the data registers of the widest set have a first width in bits. A decode unit that corresponds to the given logical processor is to decode instructions that specify the data registers of the widest set, and is to decode an atomic store to memory instruction. The atomic store to memory instruction is to indicate data that is to have a second width in bits that is wider than the first width in bits. The atomic store to memory instruction is to indicate memory address information associated with a memory location. An execution unit is coupled with the decode unit. The execution unit, in response to the atomic store to memory instruction, is to atomically store the indicated data to the memory location.

21 Claims, 14 Drawing Sheets

Related U.S. Application Data continuation of application No. 17/131,729, filed on Dec. 22, 2020, now Pat. No. 11,347,680, which is a continuation of application No. 15/089,525, filed on Apr. 2, 2016, now Pat. No. 10,901,940.

(52) U.S. Cl.
CPC ........ *G06F 9/30112* (2013.01); *G06F 9/3887* (2013.01); *G06F 9/3888* (2023.08)

(56) References Cited

U.S. PATENT DOCUMENTS

| | | | |
|---|---|---|---|
| 6,502,170 B2* | 12/2002 | Zahir | G06F 9/30021 707/999.201 |
| 2002/0012341 A1 | 1/2002 | Battle et al. | |
| 2002/0087810 A1 | 7/2002 | Boatright et al. | |
| 2004/0123078 A1 | 6/2004 | Hum et al. | |
| 2004/0216104 A1 | 10/2004 | Fluhr et al. | |
| 2005/0053012 A1 | 3/2005 | Moyer | |
| 2005/0198481 A1 | 9/2005 | Henry et al. | |
| 2006/0095609 A1 | 5/2006 | Radhakrishnan et al. | |
| 2008/0126634 A1 | 5/2008 | Gara et al. | |
| 2009/0006605 A1 | 1/2009 | Chen et al. | |
| 2010/0169581 A1 | 7/2010 | Sheaffer et al. | |
| 2010/0332801 A1 | 12/2010 | Fryman et al. | |
| 2011/0087867 A1 | 4/2011 | Jacobson et al. | |
| 2011/0153989 A1 | 6/2011 | Rajwar et al. | |
| 2012/0072984 A1 | 3/2012 | Bair et al. | |
| 2012/0079245 A1 | 3/2012 | Wang et al. | |
| 2012/0079246 A1 | 3/2012 | Breternitz et al. | |
| 2013/0263141 A1* | 10/2013 | Asaro | G06F 9/30087 718/102 |
| 2014/0052943 A1 | 2/2014 | Golliver | |
| 2014/0075163 A1 | 3/2014 | Loewenstein et al. | |
| 2014/0089635 A1 | 3/2014 | Shifer | |
| 2014/0181474 A1* | 6/2014 | Gewirtz | G06F 9/52 712/206 |
| 2014/0195775 A1 | 7/2014 | Ould-Ahmed-Vall et al. | |
| 2014/0195778 A1 | 7/2014 | Ould-Ahmed-Vall et al. | |
| 2015/0100747 A1 | 4/2015 | Kessler et al. | |
| 2015/0347475 A1 | 12/2015 | Kimura | |
| 2016/0321181 A1 | 11/2016 | Kaxiras et al. | |
| 2017/0031865 A1 | 2/2017 | Eyole et al. | |

FOREIGN PATENT DOCUMENTS

| | | |
|---|---|---|
| CN | 101770397 A | 7/2010 |
| CN | 101937331 A | 1/2011 |
| CN | 103119556 A | 5/2013 |
| CN | 103140828 A | 6/2013 |
| CN | 103827814 A | 5/2014 |
| CN | 103827815 A | 5/2014 |
| CN | 104050023 A | 9/2014 |
| CN | 105094749 A | 11/2015 |
| CN | 105453030 A | 3/2016 |
| TW | 201227505 A | 7/2012 |
| TW | 201346743 A | 11/2013 |
| TW | 201423584 A | 6/2014 |
| WO | 2014/084905 A1 | 6/2014 |
| WO | 2017/172255 A1 | 10/2017 |

OTHER PUBLICATIONS

Allowance Decision of Examination, TW App. No. 106106534, Apr. 28, 2022, 2 pages of Original Document Only.
Final Office Action, U.S. Appl. No. 15/089,525, Mar. 17, 2020, 10 pages.
First Office Action, CN App. No. 201780014781.1, Oct. 19, 2022, 21 pages of English Translation, 19 pages of Original Document.
International Preliminary Report on Patentability for Application No. PCT/US2017/020573, Oct. 11, 2018, 15 pages.
International Search Report and Written Opinion received for PCT Patent Application No. PCT/US2017/020573, May 30, 2017, 18 pages.
Non-Final Office Action received for U.S. Appl. No. 15/089,525, Sep. 11, 2019, 23 pages.
Non-Final Office Action, U.S. Appl. No. 17/827,882, Jun. 1, 2023, 9 pages.
Notice of Allowance, TW App. No. 111128487, Jan. 31, 2024, 3 pages (1 pages of English Translation and 2 pages of Original Document).
Notice of Allowance, U.S. Appl. No. 17/131,729, Jan. 25, 2022, 7 pages.
Notice of Allowance, U.S. Appl. No. 15/089,525, Sep. 16, 2020, 7 pages.
Notice of Allowance, U.S. Appl. No. 17/827,882, Feb. 22, 2024, 2 pages.
Notice of Allowance, U.S. Appl. No. 17/827,882, Jan. 31, 2024, 7 pages.
Office Action, CN App. No. 201780014781.1, Jul. 12, 2023, 20 pages (3 pages of English Translation and 17 pages of Original Document).
Office Action, CN App. No. 201780014781.1, Nov. 28, 2023, 30 pages (12 pages of English Translation and 18 pages of Original Document).
Office Action, TW App. No. 106106534, Jan. 28, 2021, 23 pages (11 pages of English Translation and 12 pages of Original Document).
Office Action, TW App. No. 111128487, Oct. 6, 2023, 15 pages (8 pages of English Translation and 7 pages of Original Document).
Bingchao et al., "Improving SIMD Utilization with Thread-Lane Shuffled Compaction in GPGPU", Chinese Journal of Electronics, vol. 24, No. 4, Oct. 2015, 5 pages.
First Office Action, CN App. No. 202111095699.0, Apr. 9, 2025, 07 pages of Original Document only.
Second Office Action, CN App. No. 202111095699.0, Jul. 17, 2025, 03 pages of Original Document only.

* cited by examiner

FIG. 2

METHOD OF PERFORMING
ATOMIC STORE TO
MEMORY INSTRUCTION
226

RECEIVE ATOMIC STORE TO MEMORY INSTRUCTION AT GIVEN LOGICAL PROCESSOR, INSTRUCTION INDICATING DATA THAT IS WIDER IN BITS THAN WIDEST DATA REGISTER THAT INSTRUCTIONS OF INSTRUCTION SET OF GIVEN LOGICAL PROCESSOR ARE ABLE TO SPECIFY, AND INSTRUCTION INDICATING MEMORY ADDRESS INFORMATION ASSOCIATED WITH MEMORY LOCATION — 228

ATOMICALLY STORE INDICATED DATA TO MEMORY LOCATION, IN RESPONSE TO ATOMIC STORE TO MEMORY INSTRUCTION — 229

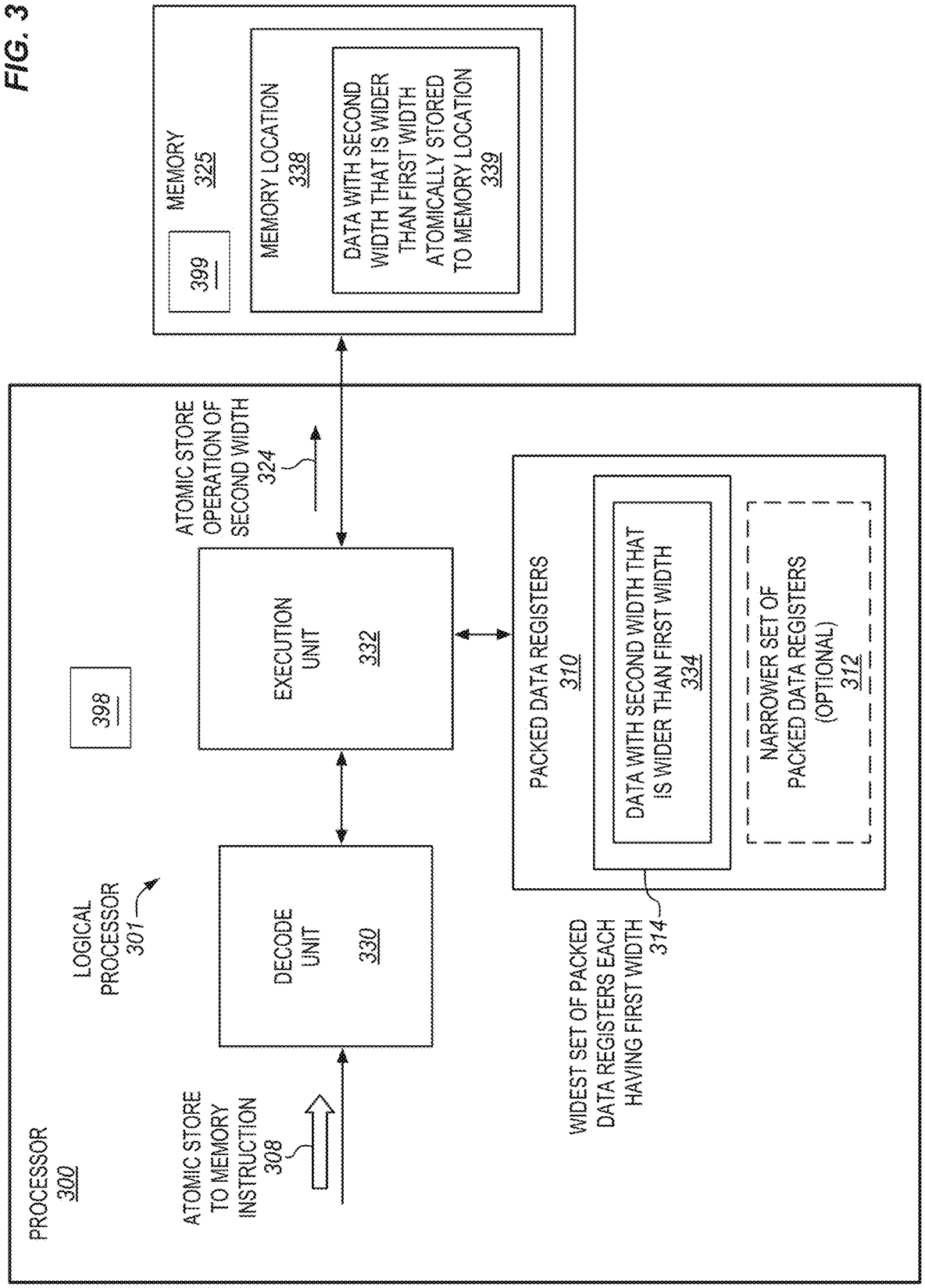

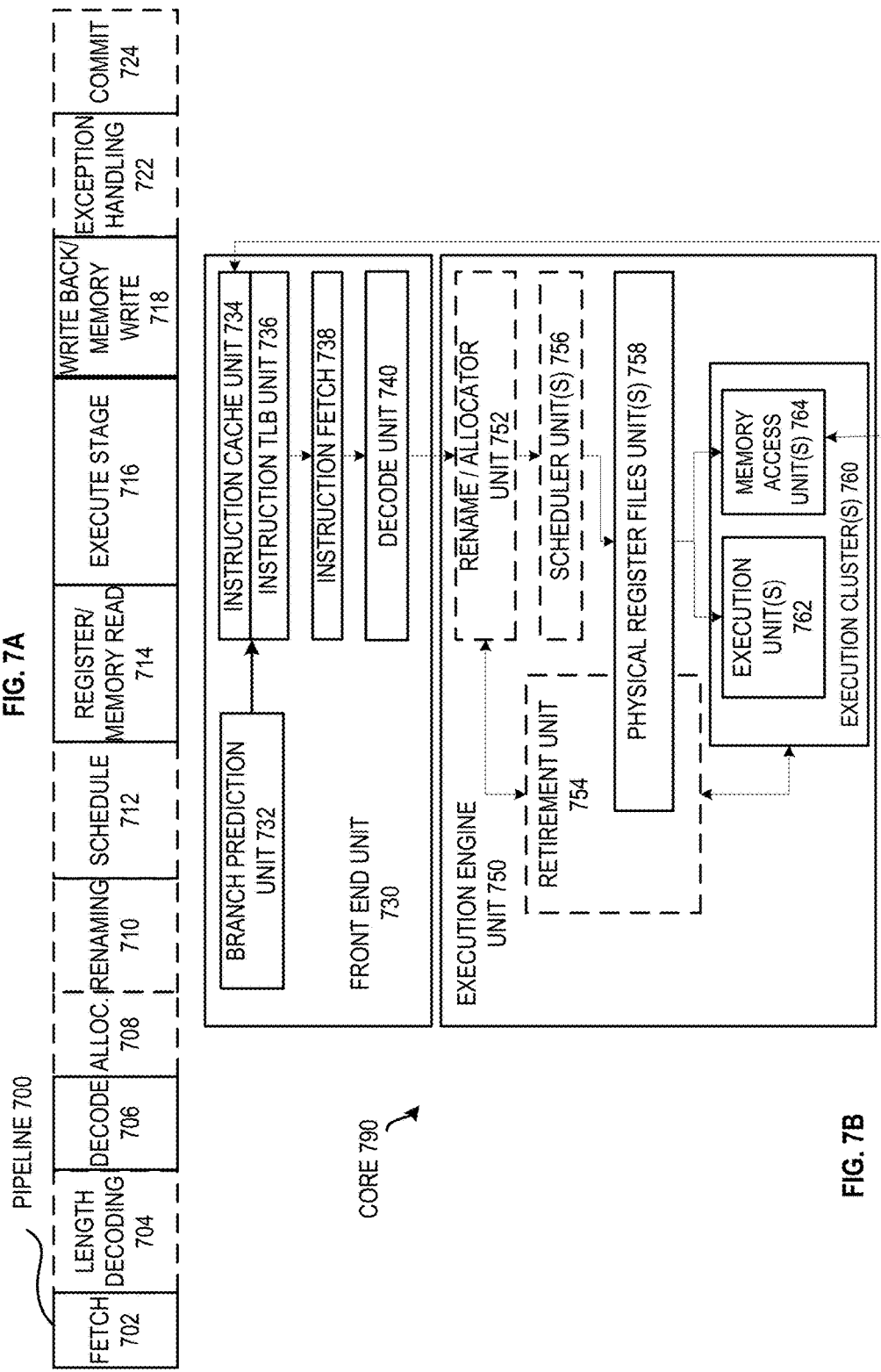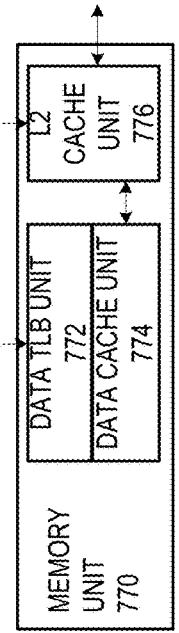

PROCESSORS, METHODS, SYSTEMS, AND INSTRUCTIONS TO ATOMICALLY STORE TO MEMORY DATA WIDER THAN A NATIVELY SUPPORTED DATA WIDTH

CROSS-REFERENCE TO RELATED APPLICATION

This patent application is a continuation of U.S. patent application Ser. No. 17/827,882, filed on May 30, 2022 entitled as PROCESSORS, METHODS, SYSTEMS, AND INSTRUCTIONS TO ATOMICALLY STORE TO MEMORY DATA WIDER THAN A NATIVELY SUPPORTED DATA WIDTH, which is a continuation of U.S. patent application Ser. No. 17/131,729, filed on Dec. 22, 2020 entitled as PROCESSORS, METHODS, SYSTEMS, AND INSTRUCTIONS TO ATOMICALLY STORE TO MEMORY DATA WIDER THAN A NATIVELY SUPPORTED DATA WIDTH, now U.S. Pat. No. 11,347,680 issued on May 31, 2022, which is a continuation of U.S. patent application Ser. No. 15/089,525, filed on Apr. 2, 2016 entitled as PROCESSORS, METHODS, SYSTEMS, AND INSTRUCTIONS TO ATOMICALLY STORE TO MEMORY DATA WIDER THAN A NATIVELY SUPPORTED DATA WIDTH, now U.S. Pat. No. 10,901,940 issued on Jan. 26, 2021, which is hereby incorporated herein by this reference in its entirety and for all purposes.

BACKGROUND

Technical Field

Embodiments described herein generally relate to processors. In particular, embodiments described herein generally relate to guaranteeing store atomicity in processors.

Background Information

Many processors have Single Instruction, Multiple Data (SIMD) architectures. In SIMD architectures, a packed data instruction, vector instruction, or SIMD instruction may operate on multiple data elements or multiple pairs of data elements simultaneously or in parallel. The processor may have parallel execution hardware responsive to the packed data instruction to perform the multiple operations simultaneously or in parallel.

Multiple data elements may be packed within one register as packed data or vector data. In packed data, the bits of the register or other storage location may be logically divided into a sequence of data elements. For example, a 128-bit wide packed data register may have two 64-bit wide data elements, four 32-bit data elements, eight 16-bit data elements, or sixteen 8-bit data elements. Each of the data elements may represent a separate individual piece of data (e.g., a pixel color, a component of a complex number, etc.), which may be operated upon separately and/or independently of the others.

BRIEF DESCRIPTION OF THE DRAWINGS

The invention may best be understood by referring to the following description and accompanying drawings that are used to illustrate embodiments. In the drawings:

FIG. 2 is a block flow diagram of an embodiment of a method of performing an embodiment of an atomic store to memory instruction to atomically store to memory data wider than a natively supported data width.

FIG. 3 is a block diagram of another embodiment of a processor that is operative to perform an embodiment of an atomic store to memory instruction to atomically store to memory data wider than a natively supported data width.

FIG. 7A is a block diagram illustrating an embodiment of an in-order pipeline and an embodiment of a register renaming out-of-order issue/execution pipeline.

FIG. 7B is a block diagram of an embodiment of processor core including a front end unit coupled to an execution engine unit and both coupled to a memory unit.

DETAILED DESCRIPTION OF EMBODIMENTS

Disclosed herein are instructions to atomically store to memory data wider than a natively supported data width, processors to execute the instructions, methods performed by the processors when processing or executing the instructions, and systems incorporating one or more processors to process or execute the instructions. In some embodiments, a processor may have a decode unit or other logic to receive and/or decode the instructions, and an execution unit or other logic to execute or otherwise perform the instructions. In the following description, numerous specific details are set forth (e.g., specific instruction operations, data formats, processor configurations, microarchitectural details, sequences of operations, etc.). However, embodiments may be practiced without these specific details. In other instances, well-known circuits, structures and techniques have not been shown in detail to avoid obscuring the understanding of the description.

Figure 1:
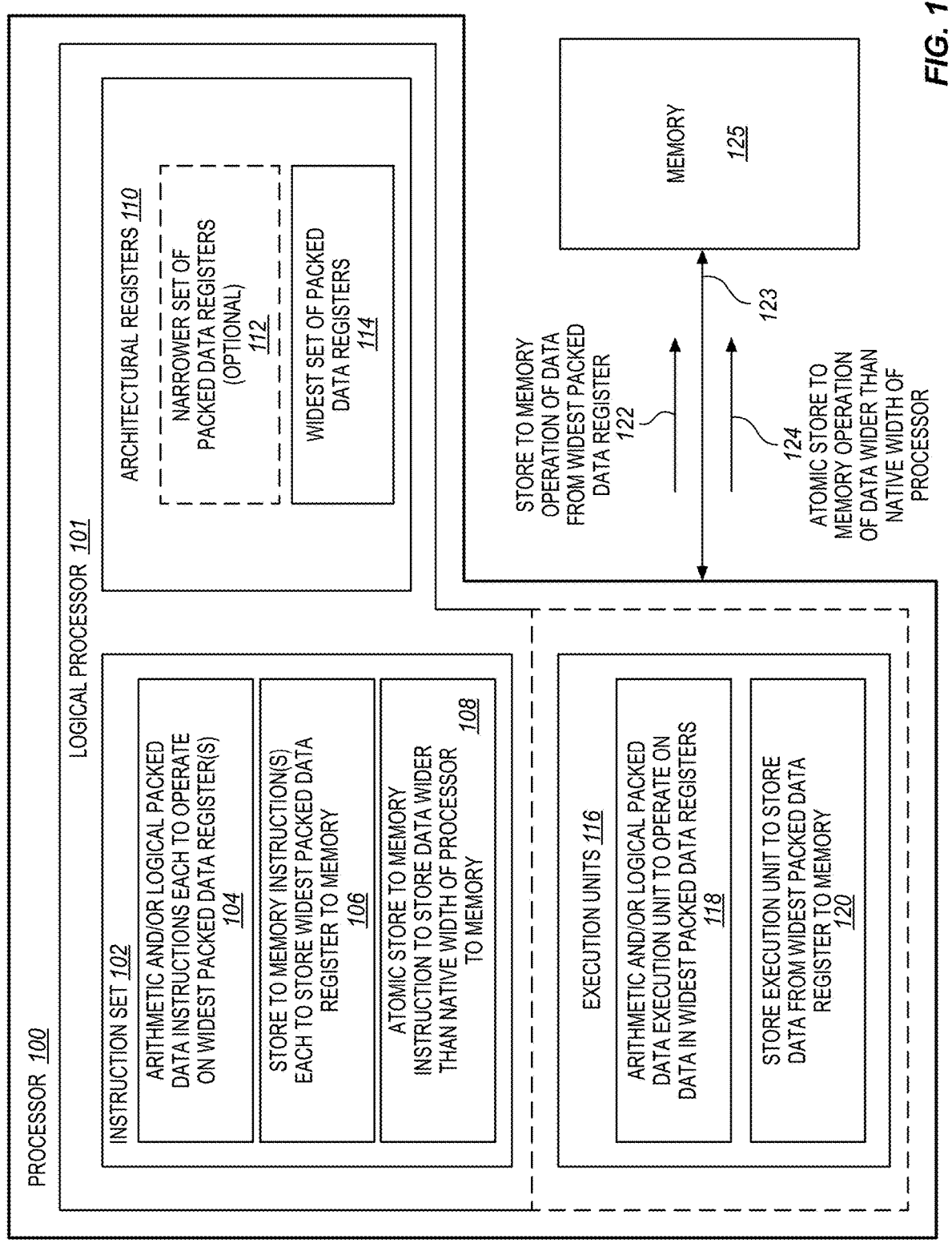
FIG. 1 is a block diagram of an embodiment of a processor that is operative to perform an embodiment of an atomic store to memory instruction to atomically store to memory data wider than a natively supported data width.

FIG. 1 is a block diagram of an embodiment of a processor 100 that is operative to perform an embodiment of an atomic store to memory instruction 108 to atomically store to memory 125 data wider than a natively supported data width. In some embodiments, the processor may be a general-purpose processor (e.g., a general-purpose microprocessor or central processing unit (CPU) of the type used in desktop, laptop, or other computers). Alternatively, the processor may be a special-purpose processor. Examples of suitable special-purpose processors include, but are not limited to, network processors, communications processors, cryptographic processors, graphics processors, co-processors, embedded processors, digital signal processors (DSPs), and controllers (e.g., microcontrollers).

The processor 100 includes at least one logical processor 101. The logical processor may also be referred to as a processor element. Examples of suitable logical processors include, but are not limited to, cores, hardware threads, thread units, and thread slots, and other logical processors or processor elements that have a dedicated context or architectural state including a program counter or instruction pointer. The term core is often used to refer to logic located on an integrated circuit that is capable of maintaining an independent architectural state (e.g., an execution state), and in which the architectural state is associated with dedicated execution and certain other resources. In contrast, the term hardware thread is often used to refer to logic located on an integrated circuit that is capable of maintaining an independent architectural state, and in which the architectural state shares access to execution or certain other resources. When some execution and/or other resources are shared for two or more architectural states, and other execution or other resources are dedicated to an architectural state, the line between such usage of the terms core and hardware thread may tend to be less distinct. Nevertheless, the cores, hardware threads, thread units, and thread slots, and other logical processors or processor elements, are often viewed by software as individual logical processors or processor elements. Generally, software threads, processes, or workloads may be scheduled on, and independently associated with, each of the cores, hardware threads, thread units, and thread slots, and other logical processors or processor elements.

The logical processor 101 has an instruction set architecture (ISA). The ISA represents the part of the architecture of the logical processor related to programming, and commonly includes the natively supported instructions, architectural registers, data types, addressing modes, memory architecture, and the like, of the logical processor. The ISA is distinguished from the microarchitecture, which generally represents the particular design techniques selected to implement the ISA. The logical processor may have any of various complex instruction set computing (CISC) architectures, reduced instruction set computing (RISC) architectures, very long instruction word (VLIW) architectures, hybrid architectures, other types of architectures. In some cases, the processor 100 may optionally have multiple logical processors that may all have the same ISA, or may have two or more logical processors with different ISA (e.g., different cores may have different ISA).

The logical processor 101 and/or its ISA includes architectural registers 110 (e.g., one or more architectural register files). The architectural registers may represent architecturally-visible registers that are visible to software and/or a programmer and/or the registers that are specified by instructions of the instruction set to identify operands. These registers are contrasted to other non-architectural or non-architecturally visible registers in a given microarchitecture (e.g., temporary registers, microarchitectural buffers, reorder buffers, etc.). For simplicity, the architectural registers may also be referred to herein simply as registers. Each of the registers may represent on-die or on-processor storage location to store data.

The architectural registers 110 may include various different types of registers. Examples of such registers include, but are not limited to, general-purpose registers, packed data registers, program status registers, control registers, memory addressing registers, and the like. The packed data registers are sometimes also referred to in the arts as vector registers or single instruction, multiple data (SIMD) registers. The packed data registers may be operative to store packed data, vector data, or SIMD data. As shown, in some embodiments, the logical processor and/or the architectural registers may include a widest set of packed data registers 114. The widest set of packed data registers 114 represents the widest or maximum sized set of packed data registers of and/or supported by the logical processor in terms of their width in bits. In some embodiments, the logical processor and/or the architectural registers may also optionally include a relatively narrower set of packed data registers 112, or potentially multiple sets of packed data registers of varying width each less than the width of each of the widest set of packed data registers 114, although this is not required. As one specific non-limiting example, each of the registers of the widest set of packed data registers 114 may have a width of 128-bits, whereas each of the registers of the narrower set of packed data registers 112 may have a width of only 64-bits.

The logical processor 101 and/or its ISA also includes an instruction set 102. The instructions of the instruction set represent macroinstructions, machine-level instructions, instructions provided to the logical processor for execution, or instructions that the logical processor is natively able to decode and execute, as opposed to microinstructions or micro-ops (e.g., those which result from decoding the instructions of the instruction set). The instruction set may include various different types of instructions. A few representative examples of these different types of instructions are shown and described below to illustrate certain concepts.

As shown, the instruction set may include a set of arithmetic and/or logical packed data instructions 104 that are each to operate on the widest set of the packed data registers 114. By way of example, the arithmetic and/or logical packed data instructions may include a packed multiply instruction to multiple corresponding data elements in same relative data element positions in two source registers of the widest set of packed data registers and store the resulting products in one of the two source registers or a third register. As another example, the arithmetic and/or logical packed data instructions may include a packed add instruction to add corresponding data elements in same relative data element positions in two source registers of the widest set of packed data registers and store the resulting sums in one of the two source registers or a third register. Similarly, there may optionally be packed logical instructions (e.g., a packed logical AND instruction, a packed logical OR instruction, a packed logical AND NOT instruction, a packed logical exclusive OR (XOR) instruction, etc.). Commonly, there may be anywhere from several to many tens, if not more, of such different types of packed data instructions, which are each designed to operate on the widest set of the packed data registers, although the scope of the invention is not limited to any such number of these instructions. The width of the widest set of the packed data registers may represent the maximum sized packed data operand that the arithmetic and/or logical packed data instructions are able to specify and/or be used to operate on.

As shown, the processor 100 and/or the logical processor 101 may include at least one arithmetic and/or logical packed data execution unit (ALU) 118 that is operative to perform the arithmetic and/or logical packed data instructions 104 to operate on packed data operands stored in the widest set of packed data registers 114. Dashed lines are used to designate that, as discussed above, execution and certain other resources may either be dedicated to the logical processor or shared by multiple logical processors. In some cases, the width in bits of the arithmetic and/or logical packed data execution unit may be the same as the width in bits of each register of the widest set of packed data registers. The width in bits of the arithmetic and/or logical packed data execution unit may represent the maximum width in bits of the packed data operations that it is able to perform on one or more packed data operands (e.g., the maximum supported ALU operation). In other cases, the width in bits of the arithmetic and/or logical packed data execution unit may optionally be narrower than the width in bits of each register of the widest set of packed data registers, and different portions of the operands from the widest set of packed data registers may be sequentially sent through the narrower execution unit in a staggered or sequential fashion. As one example, a first half of a 128-bit packed data operand may be sent through a 64-bit wide execution unit, and then a second half of the 128-bit packed data operand may be sent through the 64-bit wide execution unit.

In some cases, the width in bits of a bus or other interconnect that is used to deliver data directly to and/or from the widest set of packed data registers may be narrower than the width in bits of each of the widest set of packed data registers. For example, the width of a bus or other interconnect that directly delivers data to and from the widest set of packed data registers may be only half that of the width of each of the widest set of packed data registers. In such cases, different portions (e.g., different halves) of the data of a single packed data register of the widest set may be transmitted over the bus or other interconnect sequentially or at different times. As one specific example, two 64-bit halves of the data from a single 128-bit packed data register of the widest set may be transmitted sequentially one after the other over a 64-bit interconnect.

As shown, the instruction set may commonly also include at least one store to memory instruction 106 to store data from a single one of the widest set of packed data registers 114 to the memory 125. The processor and/or the logical processor may include a store execution unit 120 that is operative to perform the store to memory instruction 106 to store the data from the single one of the widest set of packed data registers to the memory. As shown, a store to memory operation 122 may be transmitted or otherwise provided on a bus or other interconnect 123 to the memory to provide the data from the single one of the widest set of packed data registers. In some cases, the width in bits of the data transmitted or otherwise provided on the bus by the operation 122 may be the same as the width in bits of each register of the widest set of packed data registers. In other cases, the width of the data provided on the bus may be less than the width of the widest data register. In the latter case, the contents of a packed data register of the widest set may be transmitted in two or more sequential transmissions on the interconnect, and may optionally be grouped with start and stop indications so that they may form a single atomic store.

Referring again to FIG. 1, in some embodiments, the instruction set also includes the at least one atomic store to memory instruction 108. The atomic store to memory instruction when performed may be operative to cause the processor and/or the logical processor to atomically store to the memory 125 data that has a wider width in bits than a natively supported data width. As shown, an atomic store to memory operation 124 may be performed over the bus or other interconnect. The atomic store may be such that either all of the data will be stored in its entirety, or none of the data is stored, but only a portion or subset of the data is guaranteed or ensured not be stored. That is there may be a store completion atomicity guaranty. The atomicity may also guarantee that the data stored by the atomic store will not be interleaved with data stored by other stores. The atomicity may be with respect to other accesses to the data so that any such accesses will either observe all of the data stored in its entirety, or none of the data stored, but will not observe only a portion or subset of the data stored. The atomicity may also be with respect to a power failure, system crash, reboot, or other such event, so that even in the face of such events, either all of the data will be stored in its entirety, or none of the data is stored, but only a portion or subset of the data is guaranteed or ensured not be stored.

In some embodiments, the atomic store may be for data that is wider than a natively supported data width of the logical processor 101 and/or the processor 100. The natively supported data width may manifest itself in different ways in different embodiments. In some embodiments, the natively supported data width may represent the width in bits of the widest set of packed data registers 114, and/or the width of the packed data operand(s) that are to be operated on the by the arithmetic and/or logical packed data instructions 104. In some embodiments, the natively supported data width may represent the width of the arithmetic and/or logical packed data execution unit 118 (e.g., when it has the same width of the packed data operands indicated by the instructions such that multiple portions of the packed data operands are not sequentially pumped through it). In some embodiments, the natively supported data width may represent the width of a bus (e.g., a load pipe) narrower than the widest set of packed data registers that is used to transmit data directly to and directly from the widest set of packed data registers. For example, the processor may potentially have wide packed data registers, but the amount of data that can be atomically stored (i.e., without the approaches disclosed herein) may be limited by the width of the bus leading from these wide packed data registers. In some embodiments, the natively supported data width may represent the width of the packed data operand that is to be stored to the memory by the store to memory instruction 106. In some embodiments, the natively supported data width may represent the width of the data that is to be stored to the memory by the store to memory operation 122. The natively supported data width pertains to at least the logical processor 101 that performs the atomic store to memory instruction 108 and/or that has the instruction set 102 that includes the atomic store to memory instruction 108. In some embodiments, the processor 100 may optionally have an additional core, hardware thread, or other logical processor (not shown), which may have a different natively supported data width, but this additional logical processor may not be the one that performs the atomic store to memory instruction 108 and/or may not have an instruction set that includes the atomic store to memory instruction 108.

There are various possible uses of such an atomic store operation. One example of such a use is to atomically update a piece of data in a database. Another example of such a use is to atomically update a piece of shared data in a multi-processing environment. Yet another example of such a use is to atomically communicate data to a shared device (e.g., through a memory-mapped input-output (MMIO) register). For example, as will be explained further below, this may be used to assign or provide work to an accelerator device or other type of device that is shared by multiple logical processors. A still further possible example of such a use is to atomically store data to a 3D XPoint™ non-volatile memory. Yet another example of such a use is to atomically store data to a location to replace a lock, a semaphore, to update a shared variable, to synchronize, to coordinate, or the like. Still other uses of such an atomic store operation are contemplated and will be apparent to those skilled in the art and having the benefit of the present disclosure.

The store completion atomicity guaranty on the wider data may be one that typically cannot be achieved through performing multiple different instances of the store to memory instruction 106 each to store a different corresponding narrower portion of data from a different corresponding register of the widest set of packed data registers 114. For example, the different instances of the store to memory instruction would generally be performed at different times. The cumulative amount of data from such differently timed store instructions would not all appear in the memory at the same time. Rather, the different narrower portions of data would typically be stored in the memory at different times. Similarly, the different narrower portions of data would be transmitted or provided in differently timed transactions or signals on a bus or other interconnect. Due to the different times involved, it is possible that another logical processor may perform an intervening read and/or store operation to the location where the data is to be stored in the memory after only some of these different store operations have been performed. It is also possible that an intervening power failure, system crash, reboot, or other such event may occur after only some of these different store operations have been performed. Due to such possibilities, such use of multiple different sequential store to memory instructions and/or differently timed store operations transmitted over a bus or other interconnect generally cannot be used to provide the store completion atomicity guaranty on the wider data.

In the specific example embodiment of FIG. 1, the widest set of packed data registers 114 represented the widest data registers of the processor 100. However, in other embodiments, other data registers may represent the widest data registers of the processor. Likewise, the arithmetic and/or logical packed data instructions 104 indicated the widest packed data operands. However, in other embodiments, other instructions of the instruction set may specify the widest operands, which may not necessarily be packed data operands. Similarly, in other embodiments, the instruction set may include a store to memory instruction to indicate an operand in another type of widest data registers (i.e., not necessarily a packed data register) to be stored to the memory. Likewise, the execution units 116 may include execution units to operate on other widest data registers (i.e., not necessarily packed data registers) and operands (i.e., not necessarily packed data operands).

FIG. 2 is a block flow diagram of an embodiment of a method 226 of performing an embodiment of an atomic store to memory instruction. In various embodiments, the method may be performed by a processor, an instruction processing apparatus, digital logic device, or an integrated circuit.

The method includes receiving the atomic store to memory instruction at a given logical processor, at block 228. In various aspects, the instruction may be received at an instruction fetch unit of the given logical processor, an instruction cache of the given logical processor, a prefetch unit of the given logical processor, or at a decode unit of the given logical processor. The atomic store to memory instruction may specify (e.g., explicitly specify through one or more fields or a set of bits), or otherwise indicate (e.g., implicitly indicate), data which is to be atomically stored. In some embodiments, the indicated data may be wider in bits than a widest data register (e.g., a widest packed data register) corresponding to the given logical processor that other instructions (e.g., any packed multiply instructions, any packed add instructions, any packed arithmetic and/or logical instructions, etc.) of an instruction set of the given logical processor are able to specify or otherwise indicate.

A few illustrative examples of suitable widths can be mentioned. For example, in some embodiments, the width of the indicated data may be 128-bits and the width of the widest data register (e.g., packed data register) may be 256-bits. In other embodiments, the width of the indicated data may be 128-bits and the width of the widest data register (e.g., packed data register) may be 512-bits. In still other embodiments, the width of the indicated data may be 128-bits and the width of the widest data register (e.g., packed data register) may be 1024-bits. In further embodiments, the width of the indicated data may be 256-bits and the width of the widest data register (e.g., packed data register) may be 512-bits. In yet further embodiments, the width of the indicated data may be 256-bits and the width of the widest data register (e.g., packed data register) may be 1024-bits. In still other embodiments, the width of the indicated data may be 512-bits and the width of the widest data register (e.g., packed data register) may be 1024-bits.

The atomic store to memory instruction may also specify (e.g., explicitly specify through one or more fields or a set of bits), or otherwise indicate (e.g., implicitly indicate), memory address information. The memory address information may be associated with a memory location (e.g., a destination memory location where the indicated data is to be atomically stored). For example, the memory address information may be useable, potentially in combination with other information (e.g., information from a segment register, etc.), to generate a memory address for the memory location. In some embodiments, the memory location may correspond to a MMIO range (e.g., a MMIO control register of a device), although the scope of the invention is not so limited.

The indicated data (e.g., which is to be atomically stored in response to the instruction) may initially be stored in and/or accessed from different initial storage locations in different embodiments. In some embodiments, this data may initially be stored in multiple data registers (e.g., multiple of the widest packed data or other widest registers corresponding to the given logical processor). In such embodiments, the atomic store to memory instruction may specify or otherwise indicate at least one of these data registers (e.g., specify one widest data register of a sequence of consecutive widest data registers with an implicit understanding that the other sequential registers are also to be used). Alternatively, in other embodiments, this data which is to be atomically stored may initially be stored in a source memory location. In such embodiments, the atomic store to memory instruction may specify or otherwise indicate additional memory address information associated with (e.g., used potentially in combination with other information to generate a memory address for) the source memory location. Also, in such embodiments, the atomic store to memory instruction may cause the data which is to be atomically stored to initially be loaded from this source memory location (e.g., loaded into multiple of the architectural widest packed data or other widest data registers corresponding to the given logical processor, or loaded into one or more non-architectural temporary registers or storage locations of the processor).

The method also includes atomically storing the indicated data to the memory location, in response to and/or as a result of the atomic store to memory instruction, at block 229. In some embodiments, this may include transmitting the indicated data that is wider that the widest packed data or other widest register on a bus or other interconnect toward the memory location. In some embodiments, as will be explained further below, atomically storing the indicated data to the memory location may optionally be used to assign work to another device (e.g., an accelerator device), although the scope of the invention is not so limited.

The illustrated method involves architectural operations (e.g., those visible from a software perspective). In other embodiments, the method may optionally include one or more microarchitectural operations. By way of example, the instruction may be fetched by a fetch unit of and/or corresponding to the given logical processor, decoded by a decode unit of and/or corresponding to the given logical processor, the data may be accessed, an execution unit corresponding to the given logical processor may perform microarchitectural operations to implement the instruction, etc. In some embodiments, the microarchitectural operations to implement the instruction may optionally include sequentially storing a plurality of portions of the indicated data, collectively representing a total amount of the indicated data, to a staging buffer, and then concurrently storing the total amount of the indicated data and/or the plurality of portions of the indicated data from the staging buffer (e.g., to a write combining buffer), as will be explained in further detail below.

FIG. 3 is a block diagram of an embodiment of a processor 300 that is operative to perform an embodiment of an atomic store to memory instruction 308. In various embodiments, the processor may represent at least a portion of an integrated circuit, may be included on a die or semiconductor substrate, may include semiconductor material, may include transistors, etc. In some embodiments, the processor 300 may optionally be and/or be included in the processor 100 of FIG. 1, although this is not required. The previously described optional characteristics and details of the processor 100 also optionally apply to the processor 300. In some embodiments, the processor 300 may optionally be used to perform the method 226 of FIG. 2. The components, features, and specific optional details described herein for the processor 300 may also optionally apply to the method 226 which may optionally be performed by the processor 300. Alternatively, the method 226 may optionally be performed by a similar or different processor or apparatus. Moreover, the processor 300 may optionally perform similar or different methods than the method 226.

The processor includes at least a logical processor 301. The logical processor includes and/or supports a set of architectural packed data registers 310. Each of the packed data registers may represent an on-die (or on integrated circuit) storage location that is operative to store packed data, vector data, or SIMD data. The packed data registers may be implemented in different ways in different microarchitectures and are not limited to any particular type of design. Examples of suitable types of registers include, but are not limited to, dedicated physical registers, dynamically allocated physical registers using register renaming, and combinations thereof. As shown, in some embodiments, the packed data registers 310 corresponding to and/or supported by the logical processor 301 may include a widest set of packed data registers 314. Each of the packed data registers of the widest set may have a first width in bits. In some embodiments, the packed data registers may optionally include a narrower set of packed data registers 312, although this is not required. Each of the packed data registers of the narrower set may have a narrower width than each of the packed data registers of the widest set. The widest set of packed data registers 314 in this specific example embodiment represent the widest data registers of the processor, although in other embodiments other widest data registers of the processor may optionally be non-packed data registers.

During operation, the processor 300 and/or the logical processor 301 may receive the atomic store to memory instruction 308. For example, the instruction may be received from memory on a bus or other interconnect. In various embodiments, the instruction may be stored in an instruction cache of and/or corresponding to the logical processor, may be fetched by a fetch unit of and/or corresponding to the logical processor, or the like. The instruction may represent a macroinstruction, machine code instruction, or other instruction or control signal of an instruction set of the logical processor 301 and/or the processor 300. In some embodiments, the atomic store to memory instruction may explicitly specify (e.g., through one or more fields or a set of bits), or otherwise indicate (e.g., implicitly indicate), data 334 that is to have a second width in bits that is wider than the first width in bits of each of the packed data registers of the widest set (or other widest data registers of the processor).

To further illustrate, it may be helpful to specifically mention a few illustrative examples of suitable widths. By way of example, in some embodiments, the second width of the indicated data 334 may be 128-bits and the first width of each of the widest packed data registers 314 (or other widest architectural registers) may be 256-bits. In other embodiments, the second width may be 128-bits and the first width may be 512-bits. In still other embodiments, the second width may be 128-bits and the first width may be 1024-bits. In further embodiments, the second width may be 256-bits and the first width may be 512-bits. In yet further embodiments, the second width may be 256-bits and the first width may be 1024-bits. In still other embodiments, the second width may be 512-bits and the first width may be 1024-bits. These are just a few illustrative examples of suitable widths.

The atomic store to memory instruction may also specify (e.g., explicitly specify through one or more fields or a set of bits), or otherwise indicate (e.g., implicitly indicate), memory address information. The memory address information may be associated with a memory location 338 (e.g., a destination memory location) in memory 325 where the indicated data 334 is to be atomically stored as data 339 with the second width that is wider than the first width. For example, the indicated memory address information may be useable, potentially in combination with other information (e.g., information from a segment register, etc.), to generate a memory address for the memory location. Various different types of memory address information are possible. The indicated address information may either represent absolute memory address information or relative memory address information, which may indicate a memory location relative to a base memory address or other memory location. In addition, various different indirect memory addressing modes may optionally be used. As one specific example, the instruction may implicitly indicate a register (e.g., a general-purpose register) that is used to store relative memory address information that may be combined with additional memory address information stored in another implicit register (e.g., a code, data, or extended segment register) to generate the final memory address used to identify the memory location 338 having the first byte or other addressable storage element where the data 339 is to be atomically stored. This is just one example. Other forms of the address information are also possible. Also, rather than the address information being provided in one or more registers, potentially some or all of the address information may be provided by bits of the instruction (e.g., an immediate).

The indicated data 334 may initially be stored in and/or accessed from different initial storage locations in different embodiments. As shown, in some embodiments, the data 334 may initially be stored in the widest packed data registers 314 (or in other widest data registers). Since the data 334 is has the second width that is wider than the first width of each of the packed data registers of the widest set, the data may be stored in at least two of the packed data registers of the widest set. In such embodiments, the atomic store to memory instruction may specify or otherwise indicate at least one of these multiple packed data registers of the widest set. For example, the instruction may have a field or set of bits to specify one of the packed data registers of the widest set and one or more other packed data registers of the widest set (e.g., one or more sequential registers) may be implicitly indicated (e.g., the processor may understand from an opcode of the instruction to use these registers without the instruction needing to have additional bits to explicitly specify it). Alternatively, in other embodiments, the data 334 may instead initially be stored in a source memory location (not shown) in the memory 325. In such embodiments, the atomic store to memory instruction may specify or otherwise indicate additional memory address information associated with (e.g., used potentially in combination with other information to generate a memory address for) the source memory location. Also, in such embodiments, the atomic store to memory instruction may cause the data which is to be atomically stored to initially be loaded from this source memory location (e.g., loaded into multiple of the architectural widest packed data registers 314 or loaded into one or more non-architectural temporary registers or storage locations (not shown) of the processor).

Referring again to FIG. 3, the logical processor 301 includes a decode unit or decoder 330. The decode unit may be operative to receive and decode instructions of an instruction set of the logical processor 301 including instructions (e.g., the arithmetic and/or logical packed data instructions 104) that specify registers in the widest set of packed data registers 314 (or other widest data registers). The decode unit may also be operative to receive and decode the atomic store to memory instruction 308. The decode unit may output one or more relatively lower-level instructions or control signals (e.g., one or more microinstructions, micro-operations, micro-code entry points, decoded instructions or control signals, etc.), which reflect, represent, and/or are derived from the relatively higher-level atomic store to memory instruction. In some embodiments, the decode unit may include one or more input structures (e.g., port(s), interconnect(s), an interface) to receive the atomic store to memory instruction, an instruction recognition and decode logic coupled therewith to recognize and decode the atomic store to memory instruction, and one or more output structures (e.g., port(s), interconnect(s), an interface) coupled therewith to output the lower-level instruction(s) or control signal(s). The decode unit may be implemented using various different mechanisms including, but not limited to, microcode read only memories (ROMs), look-up tables, hardware implementations, programmable logic arrays (PLAs), and other mechanisms suitable to implement decode units.

In some embodiments, instead of the atomic store to memory instruction being provided directly to the decode unit 330, an instruction emulator, translator, morpher, interpreter, or other instruction conversion module may optionally be used. Various types of instruction conversion modules may be implemented in software, hardware, firmware, or a combination thereof. In some embodiments, the instruction conversion module may be located outside the processor, such as, for example, on a separate die and/or in a memory (e.g., as a static, dynamic, or runtime emulation module). By way of example, the instruction conversion module may receive the atomic store to memory instruction, which may be of a first instruction set, and may emulate, translate, morph, interpret, or otherwise convert the atomic store to memory instruction into one or more corresponding intermediate instructions or control signals, which may be of a second different instruction set. The one or more intermediate instructions or control signals of the second instruction set may be provided to a decode unit (e.g., decode unit 330), which may decode them into one or more lower-level instructions or control signals executable by native hardware of the processor (e.g., one or more execution units).

Referring again to FIG. 3, the logical processor 301 also includes an execution unit 332. The execution unit 332 is coupled with the decode unit 330 and is coupled with the packed data registers 310. The execution unit may receive the one or more decoded or otherwise converted instructions or control signals that represent and/or are derived from the atomic store to memory instruction. The execution unit may also receive the indicated data 334. The execution unit may be operative in response to and/or as a result of the atomic store to memory instruction (e.g., in response to one or more instructions or control signals decoded from the instruction and/or in response to the instruction being decoded and/or in response to the instruction being provided to a decode unit) to atomically store the indicated data 334 to the memory location 338 in the memory as data 339. As shown, in some embodiments, the data 339 may have a second width in bits that is wider than the first width in bits of each of the registers of the widest set of packed data registers 314 (or other widest architectural data registers). This is one way in which the data 334 and/or the data 339 may be wider than the natively supported data width of the logical processor 301. In other embodiments, the data 334 and/or the data 339 may be wider than the natively supported data width of the logical processor 301 in various other ways, as described elsewhere herein.

The execution unit 332 and/or the logical processor 301 and/or the processor 300 may include specific or particular logic (e.g., transistors, integrated circuitry, or other hardware potentially combined with firmware (e.g., instructions stored in non-volatile memory) and/or software) that is operative to perform the atomic store to memory instruction 308 and/or atomically store the data 334 to the memory 325 result in response to and/or as a result of the atomic store to memory instruction (e.g., in response to one or more instructions or control signals decoded from the atomic store to memory instruction). In some embodiments, the execution unit may include one or more input structures (e.g., port(s), interconnect(s), an interface) to receive the data 334, circuitry or logic coupled therewith to receive and process the data 334, and one or more output structures (e.g., port(s), interconnect(s), an interface) coupled therewith to output the data 339 towards the memory 325.

Figure 5:
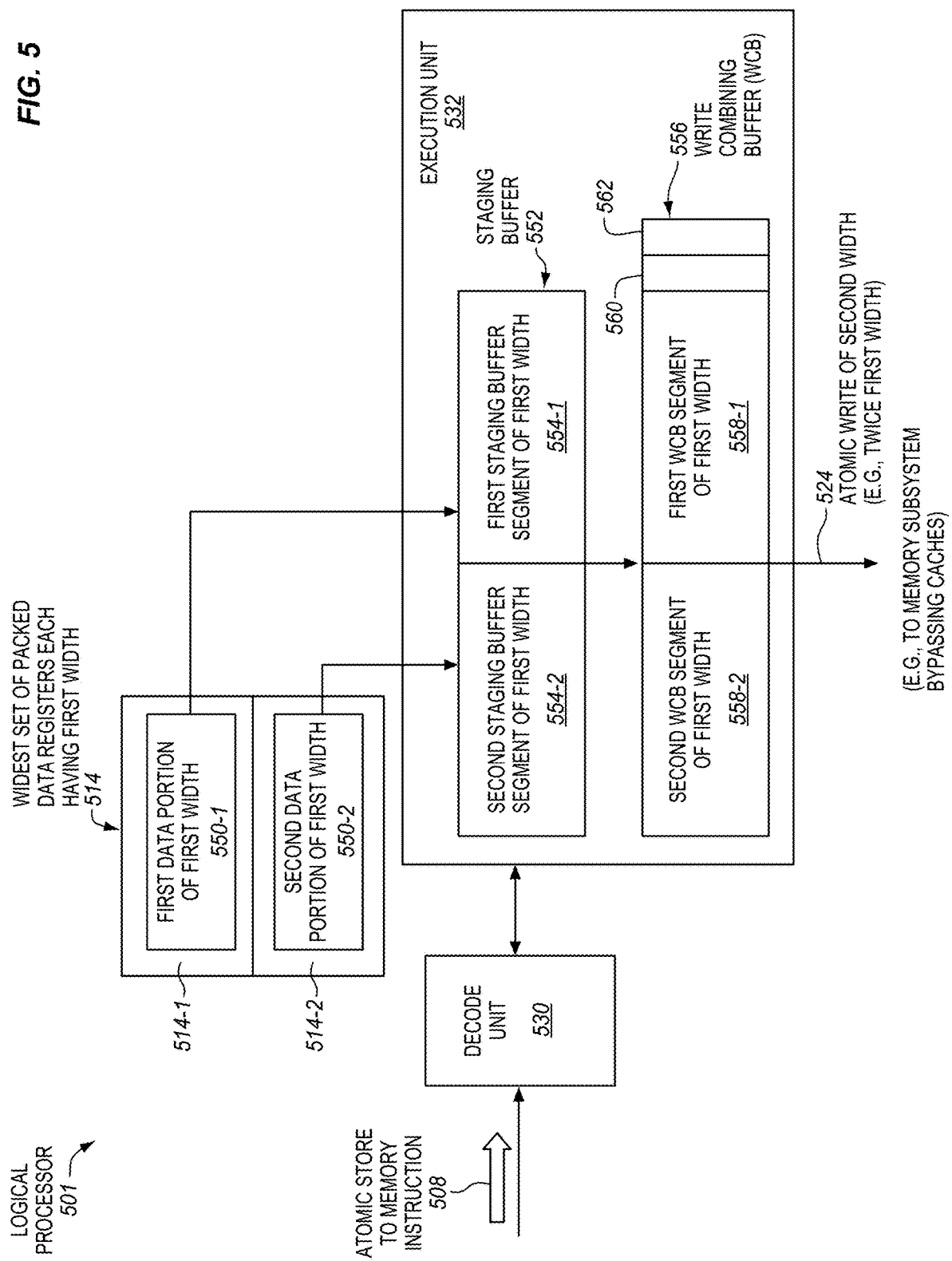
FIG. 5 is a block diagram of an embodiment of a logical processor having a first detailed example embodiment of an execution unit that includes a staging buffer and a write combining buffer.
Figure 6:
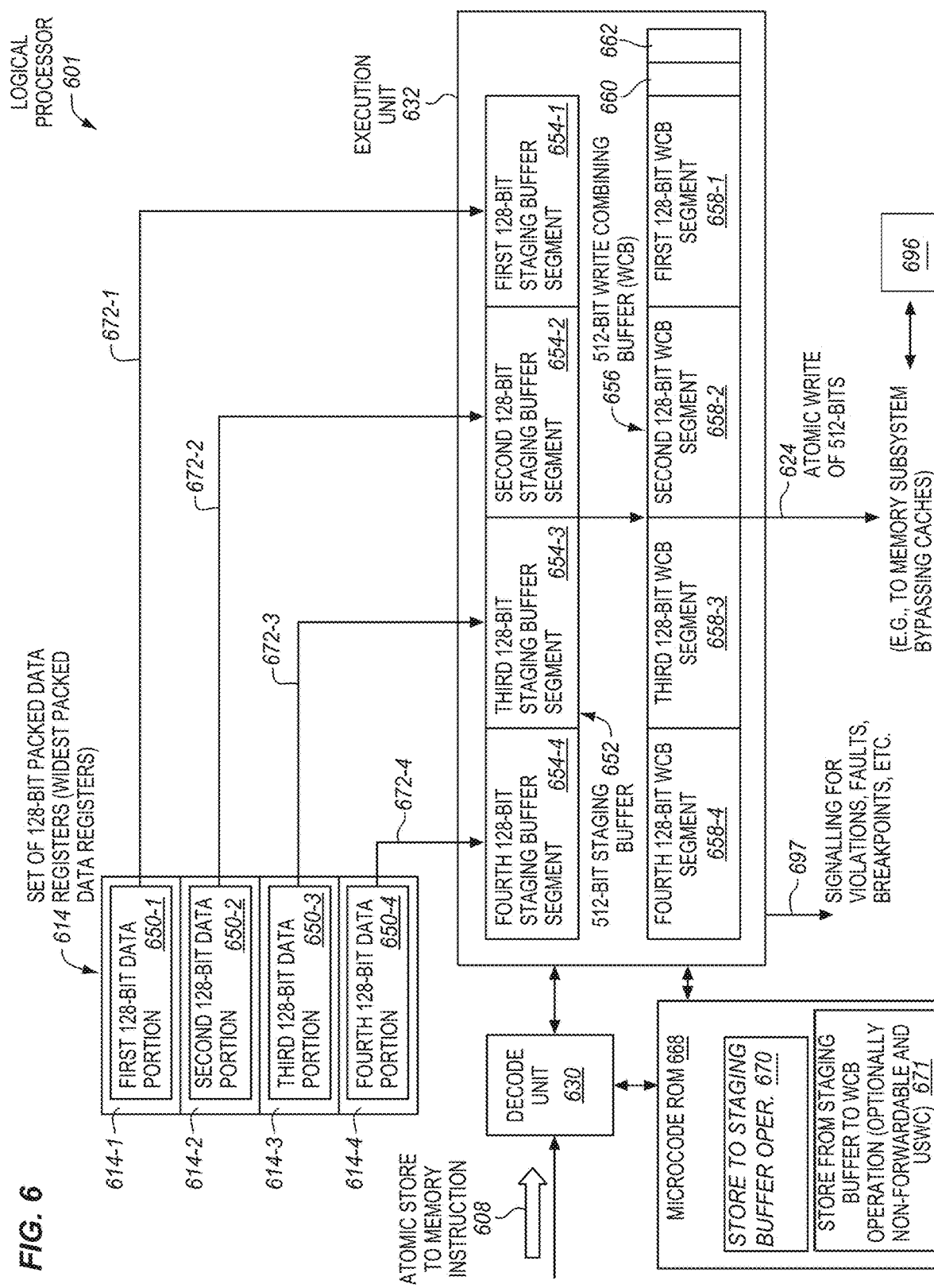
FIG. 6 is a block diagram of an embodiment of a logical processor having a more specific second detailed example embodiment of an execution unit that includes a staging buffer and a write combining buffer.

In some embodiments, the execution unit may include the circuitry or logic shown and described for any one or more of FIGS. 5-6, which are illustrative examples of suitable micro-architectural arrangements, although the scope of the invention is not so limited. As will be explained further below, in some embodiments, the execution unit may include a staging buffer (not shown). In some embodiments, the execution unit, in response to the atomic store to memory instruction, may be operative to sequentially store multiple different portions of the indicated data 334 collectively representing a total amount of the indicated data to the staging buffer, and then may be operative to concurrently store the total amount of the indicated data and/or the multiple different portions of the indicated data from the staging buffer. In some embodiments, the execution unit may also have a write combining buffer (not shown), and the total amount of the indicated data may optionally be concurrently stored to the write combining buffer. Alternatively, the total amount of the indicated data may optionally be concurrently stored to another storage location (e.g., a bus queue, another queue, etc.), written out to a bus directly, or the like. In some embodiments, the execution unit, in response to the atomic store to memory instruction, may also optionally be operative to configure the write combining buffer (if used) to not allow a younger store operation to merge with the write combining buffer, after the multiple different portions of the indicated data have been stored to the write combining buffer. In some embodiments, the execution unit, in response to the atomic store to memory instruction, may also optionally be operative to configure the write combining buffer (if used) for eviction, after (e.g., often within from one or about ten clock cycles of the logical processor after) the multiple different portions of the indicated data have been stored to the write combining buffer.

To avoid obscuring the description, a relatively simple processor and logical processor have been shown and described. However, the processor may optionally include other processor components. For example, various different embodiments may include various different combinations and configurations of the components shown and described for any of FIGS. 7B and 8A/B. All of the components of the processor may be coupled together to allow them to operate as intended.

Figure 4:
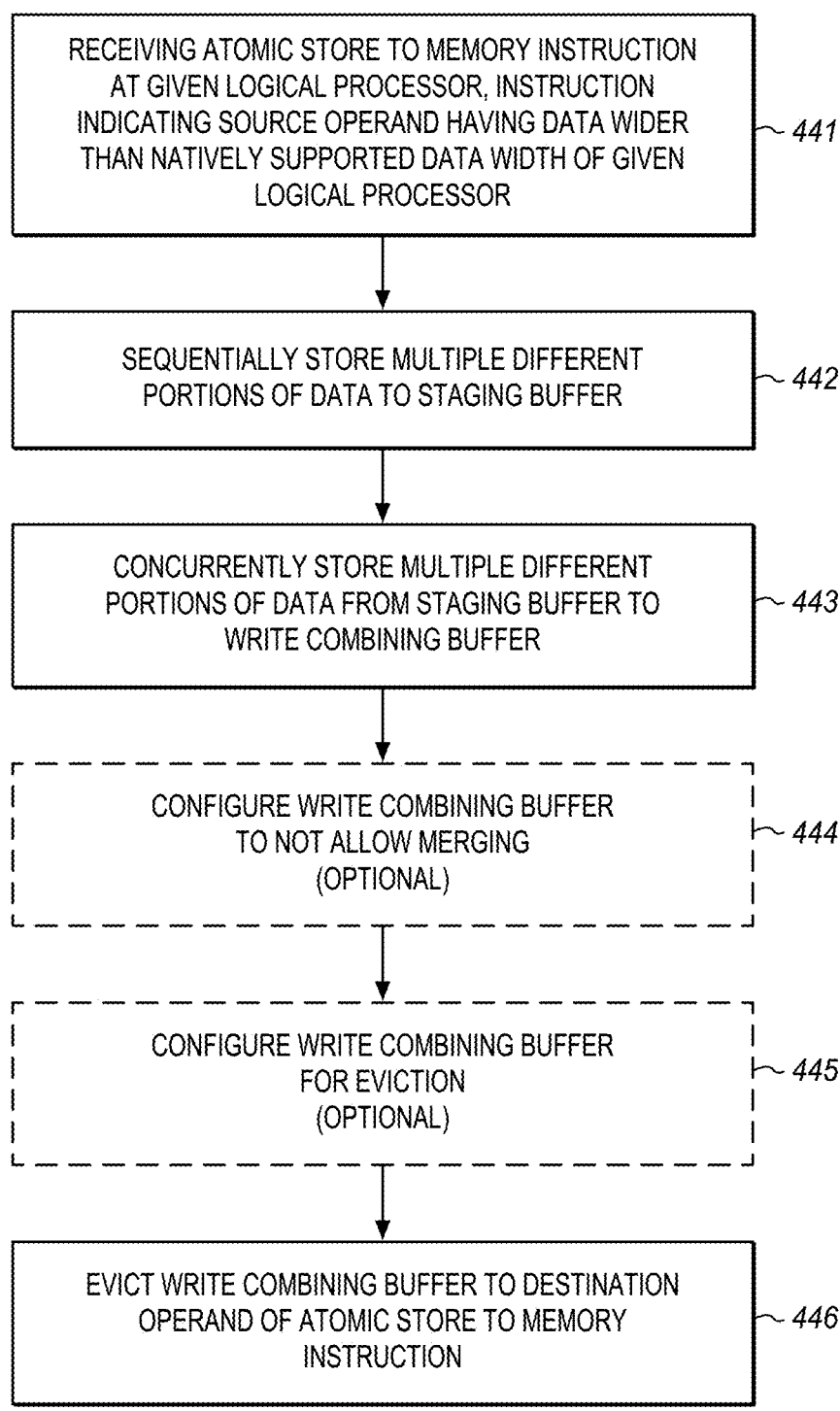
FIG. 4 is a block flow diagram of a more detailed example embodiment of a method of performing an example embodiment of an atomic store to memory instruction.

FIG. 4 is a block flow diagram of a more detailed example embodiment of a method 440 of performing an example embodiment of an atomic store to memory instruction. In various embodiments, the method may be performed by a processor, an instruction processing apparatus, digital logic device, or an integrated circuit. In some embodiments, the method 440 may be performed by and/or with the processor 300 of FIG. 3 and/or using the instruction of 308 FIG. 3. The components, features, and specific optional details described herein for the processor 300 and/or the instruction 308, also optionally apply to the method 440. Alternatively, the method 440 may be performed by and/or within a similar or different processor or apparatus and/or using a similar or different instruction. Moreover, the processor 300 may perform methods the same as, similar to, or different than the method 440.

The method includes receiving the atomic store to memory instruction at a given logical processor, at block 441. In some embodiments, the instruction may indicate a source operand having data. In some embodiments, the data may be wider than a natively supported data width of the given logical processor. For example, in some embodiments, the data may be wider than a widest packed data or other widest data register of and/or corresponding to and/or supported by the given logical processor. At block 442, multiple different portions of the data from the source operand collectively representing the total amount of the data may be sequentially stored to multiple different corresponding portions of a staging buffer, in response to the instruction. At block 443, the multiple different portions of the data and/or the total amount of the data stored in the staging buffer may be concurrently stored to a write combining buffer, in response to the instruction. At block 444, the write combining buffer may optionally be configured to not allow merging, in response to the instruction, after the multiple different portions of the data have been stored to the write combining buffer. This may help to prevent a younger store operation (e.g., which is younger than and/or subsequent to the atomic store to memory instruction in original program order) from merging with the write combining buffer. At block 445, the write combining buffer may optionally be configured to for eviction, in response to the instruction, after the multiple different portions of the data have been stored to the write combining buffer. At block 446, the write combining buffer may be evicted to a destination memory operand (e.g., a memory location) of the atomic store to memory instruction. In some embodiments, the actual eviction may be performed responsive to the atomic store to memory instruction. In other embodiments, the actual eviction may be performed outside of the performance of the atomic store to memory instruction.

It is to be appreciated that this is just one illustrative example method. In other embodiments, instead of the write combining buffer, the total amount of the data may instead be stored from the staging buffer to another storage location (e.g., a bus queue or other queue or buffer), or provided directly to a bus. For example, other embodiments may optionally omit block 445. Representatively, the processor instead may be allowed to gradually evict the write combining buffer or evict the writing combining buffer when it is ready. As another example, other embodiments may optionally omit block 444. Representatively, eviction of the write combining buffer may optionally be induced immediately after block 443, so that there may be no need to configure the write combining buffer not to allow merging. As yet another example, blocks 444 and 445 may optionally be performed in reverse order to that shown. Other embodiments may add additional operations, replace one of the illustrated operations with a different operation, etc.

FIG. 5 is a block diagram of an embodiment of a logical processor 501 having a first detailed example embodiment of an execution unit 532 that includes a staging buffer and a write combining buffer 556 to perform an embodiment of an atomic store to memory instruction 508. In some embodiments, the logical processor 501 may optionally be used to perform the method 226 of FIG. 2 and/or the method 440 of FIG. 4. The components, features, and specific optional details described herein for the logical processor 501 may also optionally apply to the method 226 and/or the method 440. Alternatively, the method 226 and/or the method 440 may optionally be performed by a similar or different processor or apparatus. Moreover, the logical processor 501 may optionally perform similar or different methods than the method 226 and/or the method 440.

The logical processor 501 includes a widest set of packed data registers 514 that each have a first width, the decode unit 530 to receive and decode the atomic store to memory instruction 508, and the execution unit 532. In the illustrated example embodiment, the widest set of packed data registers represent the widest architectural data registers of the processor, although in other embodiments other non-packed data registers may represent the widest data registers. Unless otherwise specified, these components may optionally have some or all of the characteristics of the correspondingly named components of FIG. 3. To avoid obscuring the description, the different and/or additional characteristics will primarily be described, without repeating all of the characteristics that may optionally be the same or similar.

During operation, the decode unit may be operative to receive and decode instructions of an instruction set of the logical processor 501 including instructions (e.g., the arithmetic and/or logical packed data instructions 104) that specify widest data registers (e.g., registers in the widest set of packed data registers 514). The decode unit may also be operative to receive and decode the atomic store to memory instruction 508. In some embodiments, the atomic store to memory instruction may indicate data that is to have a second width in bits that is wider than a first width in bits of each of the widest data registers of the processor (e.g., registers of the widest set of packed data registers 514). As shown, in some embodiments, the data may optionally initially be stored as at least a first data portion 550-1 of the first width in a first packed data register 514-1 of the widest set, and a second data portion 550-2 of the first width in a second packed data register 514-2 of the widest set. Alternatively, in other embodiments, the data may instead optionally initially be stored in a source memory location, as previously described.

The execution unit 532 is coupled with the decode unit 530 and is coupled with the packed data registers 510. The execution unit may be operative in response to and/or as a result of the atomic store to memory instruction 508 to atomically store the indicated data 550-1, 550-2 to a memory location and/or a destination memory operand indicated by the atomic store to memory instruction. As shown, in some embodiments, the execution unit may include the staging buffer 552 and the write combining buffer 556. The staging buffer and the write combining buffer may be coupled together (e.g., the write combining buffer may be coupled with an output of the staging buffer). In some embodiments the staging buffer may represent a new non-architectural or microarchitectural structure or storage. In some embodiments, the staging buffer may be implemented with storage and/or logic that may optionally be similar to that used for a write combining buffer but typically simpler in implementation due to more relaxed architectural guarantees and requirements than those of a write combining buffer. In some embodiments, the staging buffer may optionally be implemented in the memory execution unit, memory execution cluster, although no precise location where the staging buffer is implemented is required.

In some embodiments, the execution unit, in response to the instruction 508, may be operative to sequentially store multiple different portions of the data collectively representing a total amount of the data, for example the first data portion 550-1 and the second data portion 550-2, to different corresponding portions of the staging buffer. In some embodiments, these different portions of the data may be provided through different store operations and may come from the store buffer of a load store queue, although the scope of the invention is not so limited. As shown, the staging buffer may have a first staging buffer segment 554-1 of the first width to receive and store the first data portion 550-1, and a second staging buffer segment 554-2 of the first width to receive and store the second data portion 550-2. Each of the first and second data portions may be stored at a different time by a different corresponding store operation that stores, for example, data from a different corresponding one of the widest packed data registers (or other widest data registers), to the different corresponding segment or portion of the staging buffer. In the illustrated example, only the first and second data portions are shown, although in other embodiments there may be more than two portions (e.g., four, eight, etc.). In some embodiments, each segment may optionally be the same width as the widest packed data or other widest registers of the logical processor, although this is not required. In other embodiments, each segment may optionally be one quarter or one half the widest packed data or other widest registers of the logical processor.

In some embodiments, after all of the different portions of the data collectively representing the total amount of the data to be atomically stored to the memory have been stored to the different corresponding portions of the staging buffer, the execution unit, in response to the instruction 508, may be operative to concurrently store all of the different portions of the data collectively representing the total amount of the data to be atomically stored to the memory from the staging buffer 552 (e.g., to another storage location, to a bus, etc.). In the specific example illustrated, the other storage location where this data is to be stored is shown as the write combining buffer 556, although the scope of the invention is not so limited. As shown, the write combining buffer may have a first write combining buffer segment or portion of the first width 558-1 to store data from the first staging buffer segment or portion of the first width 554-1, and a second write combining buffer segment or portion of the first width 558-2 to store data from the second staging buffer segment or portion of the first width 554-2. In some embodiments, the write combining buffer may first be allocated, and then filled with data from the staging buffer in a single store operation. In some embodiments, the write combining buffer may be implemented in a data cache unit (e.g., in the level one (L1) data cache controller), although the scope of the invention is not so limited.

As shown, in some embodiments, the write combining buffer 556 may have one or more bits representing a no-merge field 560. In some embodiments, after the multiple different portions of the indicated data have been stored to the write combining buffer, the execution unit, in response to the instruction 508, may optionally be operative to configure the no-merge field of the write combining buffer to not allow merging (e.g., no merge allowed). By way of example, this may help to prevent a younger store operation (e.g., which is younger than and/or subsequent to the instruction 508 in original program order) from merging with the write combining buffer. This may help to prevent other data not intended to be a part of the atomic store to memory from unintentionally overwriting some of the data already in the write combing buffer that is to be atomically stored to memory.

As shown, in some embodiments, the write combining buffer 556 may have one or more bits representing an evict field 562. In some embodiments, after the multiple different portions of the indicated data have been stored to the write combining buffer, the execution unit, in response to the instruction 508, may optionally be operative to configure the evict field of the write combining buffer so that the write combining buffer is marked as and/or or ready for eviction. In some embodiments, it may be desirable to do this immediately or at least soon after the data has been stored into the write combining buffer from the staging buffer. Generally, additional data should not be merged or stored into the write combining buffer at this point, so it is best to evict the write combining buffer soon so that it can then be reclaimed and used for other store operations. Also, in the case of the data being used to assign work to an accelerator device, or other device, as will be discussed further below, it may generally be best to send this data earlier rather than later, so the other device can begin to work on it. By way of example, such configuration may often be performed within about one to about ten, or within about one to about five, clock cycles of the logical processor, although this is not required. The eviction of the write combining buffer may proceed through the memory subsystem to the memory. In some embodiments, the atomic store operation may bypass and/or not be stored into the cache(s) of the processor. For example, they may be write combining non-cacheable stores.

Advantageously, including the staging buffer 552 as a separate structure separate from the write combining buffer 556, may tend to help to simply the implementation. In some embodiments, the write combining buffers may be designed to support an architectural capability of being flushed or evited to memory at any given point in time. Without having the separate staging buffer, if instead the write combining buffer was used to accumulate the different data portions of the atomic store operation, a flush or evited to memory could occur at an intermediate point in time when some but not all of the different data parts of the atomic store operation were stored in the write combining buffer. However, guaranteeing atomicity of the entire store operation generally implies that storage of such an incomplete portion of the total store should not be performed, but rather either only the entire store or none of it. However, the staging buffer is not required to support the capability of being flushed or evited to memory at any given point in time. Accordingly, the staging buffer may accumulate or collect all of the different data portions of the atomic store operation, and then write all of these different data portions to the write combining buffer in one operation. This may help to ensure atomicity of the store of all of the data. Alternatively, if desired, the staging buffer may optionally be omitted and a write combining buffer may be used instead, with modifications to prevent a flush or eviction to memory at an intermediate point in time when some but not all of the different data parts of the atomic store operation were stored in the write combining buffer, at least when the write combining buffer is being used to implement the atomic store to memory instruction 508. For example, a given write combining buffer may be dedicated, reserved, or locked down exclusively for the implementation of the atomic store to memory instruction such that it is treated differently (e.g., does not need to support the capability of being flushed or evited to memory at any given point in time when implementing the atomic store to memory instruction).

FIG. 6 is a block diagram of an embodiment of a logical processor 601 having a more specific second detailed example embodiment of an execution unit 632 that includes a staging buffer and a write combining buffer 656 to perform an embodiment of an atomic store to memory instruction 608. In some embodiments, the logical processor 601 may optionally be used to perform the method 226 of FIG. 2 and/or the method 440 of FIG. 4. The components, features, and specific optional details described herein for the logical processor 601 may also optionally apply to the method 226 and/or the method 440. Alternatively, the method 226 and/or the method 440 may optionally be performed by a similar or different processor or apparatus. Moreover, the logical processor 601 may optionally perform similar or different methods than the method 226 and/or the method 440.

The logical processor 601 of this specific example includes a set of 128-bit packed data registers 614 representing a widest set of data registers of and/or supported by the logical processor, a decode unit 630 to receive and decode the atomic store to memory instruction 608, and the execution unit 632. Unless otherwise specified, or otherwise clearly apparent, these components may optionally have some or all of the characteristics of the correspondingly named components of FIG. 3. The execution unit of this specific example includes a 512-bit staging buffer 652 and a 512-bit write combining buffer 656. Unless otherwise specified, or otherwise clearly apparent, the staging buffer and the write combining buffer may optionally have some or all of the characteristics of those of FIG. 5. To avoid obscuring the description, the different and/or additional characteristics will primarily be described, without repeating all of the characteristics that may optionally be the same or similar.

In the embodiment of FIG. 6, 128-bit packed data registers 614 are the widest data registers of and/or supported by the logical processor 601. The atomic store to memory instruction 608 indicates data to be stored atomically to memory which includes a first 128-bit data portion 650-1, a second 128-bit data portion 650-2, a third 128-bit data portion 650-3, and a fourth 128-bit data portion 650-4. The first 128-bit data portion 650-1 is stored in a first 128-bit packed data register 614-1, the second 128-bit data portion 650-2 is stored in a second 128-bit packed data register 614-2, the third 128-bit data portion 650-3 is stored in a third 128-bit packed data register 614-3, and the fourth 128-bit data portion 650-4 is stored in a fourth 128-bit packed data register 614-4. In other embodiments, temporary registers may instead be used to hold data loaded from a source memory operand, as described elsewhere herein. In addition, 128-bits is just one illustrative example of a suitable size for these data portions and widest data registers. In other embodiments, for example, they may each be 64-bits, 256-bits, or 512-bits.

The decode unit 630 is coupled with a microcode read only memory (ROM) 668. The microcode ROM may be used to store microcode, microinstructions, or other lower level instructions, control signals, or operations for certain instructions of an instruction set of the logical processor including the atomic store to memory instruction 608. By way of example, the decode unit may decode the atomic store to memory instruction into a microcode entry point to an appropriate point in the microcode in the microcode ROM to retrieve microcode, microinstructions, or other lower level instructions, control signals, or operations (e.g., a microcode sequence) to implement the atomic store to memory instruction. The identified lower level instructions or control signals (e.g., the microcode sequence) may be output from the microcode ROM to the execution unit to implement the atomic store to memory instruction.

As shown in the illustrated example embodiment, the microcode ROM may include a store to staging buffer instruction, control signal, or operation 670, and a store from staging buffer to write combining buffer instruction, control signal, or operation 671. In some embodiments, the store to staging buffer operation 670 may be performed to store a specified or indicated one of the 128-bit data portions 650 from its initial storage location (e.g., in this example one of the 128-bit packed data registers 614) to a specified or indicated one of multiple different staging buffer segments or portions (e.g., in this example four different 128-bit staging buffer segments or portions 654). For example, a first instance of the store to staging buffer operation may be performed to perform a first store operation 672-1 to store the first 128-bit data portion 650-1 to a first 128-bit staging buffer portion or segment 654-1, and a second instance of the store to staging buffer operation may be performed to perform a second store operation 672-2 to store the second 128-bit data portion 650-2 to a second 128-bit staging buffer portion or segment 654-2. Continuing, a third instance of the store to staging buffer operation may be performed to perform a third store operation 672-3 to store the third 128-bit data portion 650-3 to a third 128-bit staging buffer portion or segment 654-3, and a fourth instance of the store to staging buffer operation may be performed to perform a fourth store operation 672-4 to store the fourth 128-bit data portion 650-4 to a fourth 128-bit staging buffer portion or segment 654-4. In this specific example, the staging buffer is a 512-bit staging buffer, although the scope of the invention is not so limited.

In some embodiments, the store to staging buffer operation 670 may indicate the data to be copied. In this example, 128-bit portions of the data are used, although in other examples wider or narrower portions of the data may be used instead. For example, the operation may have one or more bits or a field to specify one of the 128-bit packed data registers 614 having the data 650, or a temporary register having the data, or the like. The operation may also have one or more bits or a field to specify or otherwise indicate one of the multiple different segments or portions 654 of the staging buffer. Generally, the staging buffer does not need to be addressed with a full memory address. Rather, a simple index or selector value to index, address, or select one of the multiple different segments or portions of the staging buffer may be used. For example, a 1-bit index may be used to index or select between two sections or portions of the staging buffer, or a 2-bit index may be used to index or select between four sections or portions of the staging buffer, a 3-bit index may be used to index or select between eight sections or portions of the staging buffer. Accordingly, for this store operation, a base and index (e.g., as used for other operations to address memory) may be set to be zero, and a scale may be set to one, and a 1-bit, 2-bit, or 3-bit index may be configured to have an appropriate value to index or select one of the different segments or portions of the staging buffer where the data is to be stored. Also, because the staging buffer does not need to be addressed with a full memory address, there is no need for this store operation to search the translation lookaside buffers (TLBs). There is also no need to support data forwarding to younger loads. This store operation may be non-blocking because address conflicts and the like do not need to apply. There may also be no need to perform breakpoint detection, or do any nukes. This store operation also does not need to be subject to ordering restrictions.

In some embodiments, after the four different 128-bit data portions 650 have been stored to staging buffer 652, the execution unit 632, in response to the instruction 608, may be operative to perform the store from staging buffer to write combining buffer operation 671 to concurrently store the entire contents of staging buffer 652, which in this specific example is a 512-bit staging buffer, to the write combining buffer 656, which in this specific example is a 512-bit write combining buffer, in a single store operation. Alternatively, instead of a write combining buffer, another storage location may optionally be used, or the data may optionally be provided directly to a bus or other interconnect. In some embodiments, this store operation may be allowed to merge with an older write combining buffer. Or, this store operation may remiss and allocate a write combining fill buffer if it doesn't merge with an older write combining buffer. On remiss this store operation may block anything behind it in the pipeline (e.g., younger store operations), and the senior store pipe that could use the data cache fill port, such as a resource conflict condition, and fill the allocated write combining buffer with the contents of the staging buffer.

In some embodiments, the operation 671 may use a memory address according to memory address information indicated by the atomic store to memory instruction 608. As one specific example, an effective address may be calculated using a base, a scale, an index, and a displacement added to a base address from a segment register indicated by the atomic store to memory instruction to obtain a linear address, although the scope of the invention is not so limited. In some embodiments, the store, all address calculation and rights and limit checking may be associated with the address size and operand size of 512-bits for the operation, although the scope of the invention is not so limited. In some embodiments, in a 64-bit mode, canonical address form violation may be checked instead of segment limit check, although the scope of the invention is not so limited. In some embodiments, when generating the linear address for the store, if the linear address is not 64-byte aligned, it may cause a general protection fault, although the scope of the invention is not so limited. In some embodiments, the operation 671 may force the memory type to be uncacheable speculative write combining (USWC), irrespective of the underlying memory type. This store operation is a weakly ordered store operation.

In some embodiments, depending upon the particular implementation, the store corresponding to the operation 671 may optionally be marked as non-forwardable. Representatively, the processor may have a capability of satisfying a younger load with the result of an older store through an internal bypass in which the older store data is routed to the younger load. However, in some implementations, it may be desirable to prevent such forwarding. For example, this may be the case when the atomic store to memory instruction is used to submit work to an accelerator device, where it may be appropriate for the younger read to obtain data from the actual destination memory location in case the accelerator device modifies the data after it has been stored to the destination memory location. In other embodiments, for example for other uses of the atomic store to memory instruction, there may be no need to mark the store as non-forwardable.

As shown, in some embodiments, the write combining buffer 656 may have one or more bits representing a no-merge field 660, and one or more bits representing an evict field 662. In some embodiments, the operation 671 may optionally be operative to configure the no-merge field of the write combining buffer to not allow merging (e.g., no merge allowed), and may optionally be operative to configure the evict field of the write combining buffer so that the write combining buffer is marked as and/or or ready for eviction.

The atomic store to memory instructions disclosed herein may provide an architecturally supported atomic store for the total width of the data indicated to be stored. In addition, in some embodiments, the data to be atomically stored may initially be loaded from a source memory operand. In some embodiments, due to the atomicity of the store to memory operation, if any portion of the implementation of the atomic store to memory instruction faults, experiences a violation or exceptional condition, or otherwise fails, then no portion of the data should be transmitted on the bus to memory, and no portion of the data should be stored in the memory. In some embodiments, breakpoint, range based checks, fault checks, and the like, may be performed for the entire width of the destination operand where the data is to be stored atomically. By way of example, the execution unit, in response to the atomic store to memory instruction, may generate memory addresses for a first byte and a last byte of the memory location where the data is to be atomically stored (e.g., using any of various possible addressing modes), and the processor may perform checks and signaling for segment limit violations, range based violation, faults, breakpoints, and the like, for any bytes from the first byte to the last byte, when the atomic store to memory instruction retires or commits. By way of example, with regard to breakpoints, a breakpoint could have potentially been configured on any of the bytes of the destination memory location used to store the total width of the data to be stored atomically. In some embodiments, if there is a breakpoint on any of these bytes, then the breakpoint may be signaled when the instruction completes (e.g., retires or commits).

In some embodiments, the atomic store to memory instructions disclosed herein may be employed as a part of an algorithm to communicate data to another device (e.g., an accelerator device, an input and/or output (I/O) device (e.g., a high performance storage controller), etc.) through a mutually accessible storage location in memory. By way of example, the atomic store to memory instructions may represent work submission instructions employed as a part of an algorithm or set of instructions that a logical processor may perform to store data associated with work or tasks that an accelerator device is to perform to a memory location, and the accelerator device may retrieve the data from the memory location. In some cases, the memory location may correspond to a MMIO range (e.g., a MMIO control register for the device in the MMIP space of the device). A wide variety of different types of accelerators are suitable, such as, for example, graphics accelerators, networking accelerators, machine learning accelerators, computer vision accelerators, cryptographic accelerators, fixed function accelerators, general-purpose graphics processing units (GPGPU), field-programmable gate arrays (FPGAs), and the like, to name just a few examples. The memory location may represent a logical register (e.g., a work submission register) or other interface through which the processor and the accelerator device communicate. In some embodiments, the memory location may also be accessible from one or more other logical processors, which may also use the memory location to communicate data to the device (e.g., to assign work to the accelerator device). In such embodiments, the ability to atomically store the entire amount of data to the memory location may be beneficial so that the one or more other logical processors may not be able to perform interfering stores (e.g., perform concurrent or interleaving stores to the same memory location and thereby intermix data), which could corrupt the total amount of data, assign work incorrectly, or the like. The atomic store to memory instruction may help to ensure that the entire amount of data (e.g., the entire logical register in memory) is stored all at once and only by a single logical processor. Moreover, the atomic store to memory instruction may provide an efficient way that two or more logical processors may be able to assign work to the same accelerator device without needing to mutually synchronize or coordinate with one another, acquire locks, or the like.

In some embodiments, there may be different types of the atomic store to memory instructions used to implement work submission instructions or other instructions used to communicate data to another device. One such type may not expect a response from the other device related to the atomic store of the data to memory. For this type, a retire unit or commit unit of the processor may retire or commit the atomic store to memory instruction after the data has been atomically stored to the memory without waiting for and/or without needing to receive a response from the other device.

Another type of atomic store to memory instruction may expect a response from the other device related to the atomic store of the data to memory. For example, the response from the other device may indicate that the atomic store of the data to memory has been observed, acknowledged, received, accepted (e.g., a work submission has been accepted), or the like. Representatively, such a response may indicate to the logical processor that performed the atomic store operation that the atomic store operation was fully observed in the system and is now fully coherent. This response may be provided in different ways, such as, for example, by the other device configuring one or more bits in an architecturally visible register or storage location of the processor (e.g., setting one or more status bits in a status register), the other device providing a dedicated signal, the other device configuring one or more bits in the destination memory location, or in other ways. For this type of the atomic store to memory instruction, a retire unit of the processor may wait to retire the atomic store to memory instruction, after the data has been atomically stored to the memory, until after receipt of such a response from the other device. Until retired, the instruction may order younger strongly ordered instructions, such as, for example, fence instructions, strongly ordered store instructions, lock instructions, and the like, until the instruction is retired (e.g., when the data atomically stored is globally observed in the system and is fully coherent).

As one specific example, such a response may indicate to the logical processor that the atomic store operation resulted in an accepted work submission to an accelerator device. By way of example, the accelerator device may have an internal work queue or buffer (e.g., a shared work queue) that is fed by data stored to the destination memory location of the atomic store to memory instruction (e.g., a MMIO mapped shared work queue portal register). In some cases, the internal work queue or buffer may have enough storage space or capacity to accept the data of the atomic store operation, the data may be moved from the destination memory location into the internal work queue or buffer, and the accelerator device may provide a response indicating that the work submission was accepted by the accelerator device. In other cases, the internal work queue or buffer may not have enough storage space or capacity to accept the data of the atomic store operation, and the accelerator device may provide a response indicating that the work submission was not accepted by the accelerator device.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 7A is a block diagram illustrating both an exemplary in-order pipeline and an exemplary register renaming, out-of-order issue/execution pipeline according to embodiments of the invention. FIG. 7B is a block diagram illustrating both an exemplary embodiment of an in-order architecture core and an exemplary register renaming, out-of-order issue/execution architecture core to be included in a processor according to embodiments of the invention. The solid lined boxes in FIGS. 7A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724.

FIG. 7B shows processor core 790 including a front end unit 730 coupled to an execution engine unit 750, and both are coupled to a memory unit 770. The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like.

The front end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit 740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 790 includes a microcode ROM or other medium that stores microcode for certain macroinstructions (e.g., in decode unit 740 or otherwise within the front end unit 730). The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 758 comprises a vector registers unit, a write mask registers unit, and a scalar registers unit. These register units may provide architectural vector registers, vector mask registers, and general purpose registers. The physical register file(s) unit(s) 758 is overlapped by the retirement unit 754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 756, physical register file(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary embodiment, the memory access units 764 may include a load unit, a store address unit, and a store data unit, each of which is coupled to the data TLB unit 772 in the memory unit 770. The instruction cache unit 734 is further coupled to a level 2 (L2) cache unit 776 in the memory unit 770. The L2 cache unit 776 is coupled to one or more other levels of cache and eventually to a main memory.

By way of example, the exemplary register renaming, out-of-order issue/execution core architecture may implement the pipeline 700 as follows: 1) the instruction fetch 738 performs the fetch and length decoding stages 702 and 704; 2) the decode unit 740 performs the decode stage 706; 3) the rename/allocator unit 752 performs the allocation stage 708 and renaming stage 710; 4) the scheduler unit(s) 756 performs the schedule stage 712; 5) the physical register file(s) unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7) various units may be involved in the exception handling stage 722; and 8) the retirement unit 754 and the physical register file(s) unit(s) 758 perform the commit stage 724.

The core 790 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 790 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 734/774 and a shared L2 cache unit 776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 8B:
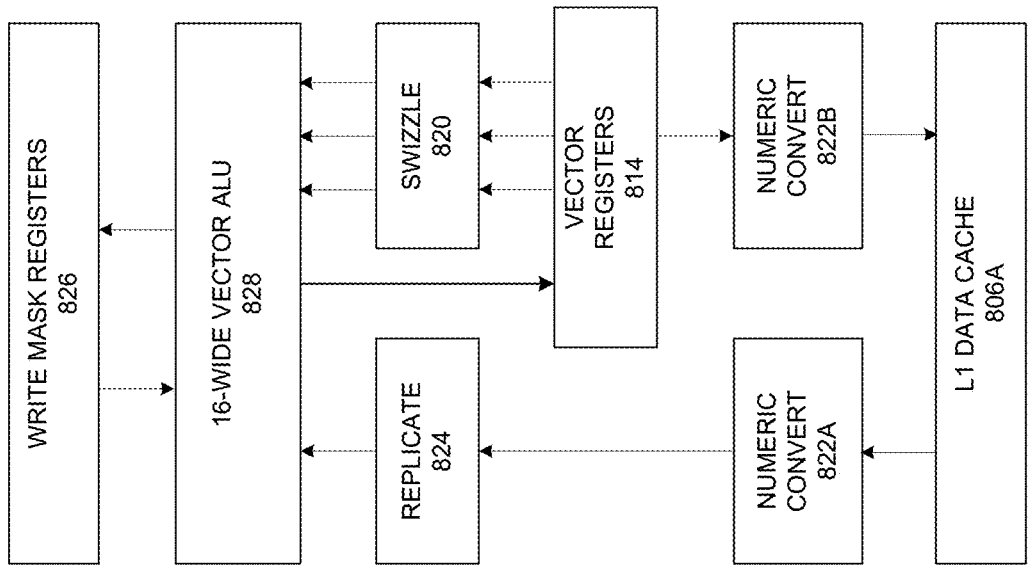
FIG. 8B is a block diagram of an embodiment of an expanded view of part of the processor core of FIG. 8A.
Figure 8A:
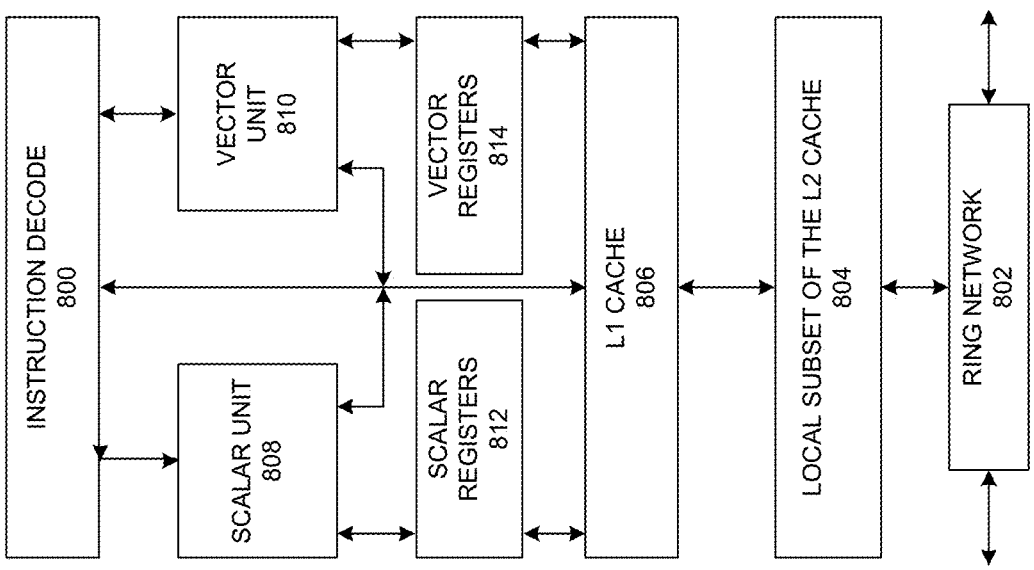
FIG. 8A is a block diagram of an embodiment of a single processor core, along with its connection to the on-die interconnect network, and with its local subset of the Level 2 (L2) cache.

FIGS. 8A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 8A is a block diagram of a single processor core, along with its connection to the on-die interconnect network 802 and with its local subset of the Level 2 (L2) cache 804, according to embodiments of the invention. In one embodiment, an instruction decoder 800 supports the x86 instruction set with a packed data instruction set extension. An L1 cache 806 allows low-latency accesses to cache memory into the scalar and vector units. While in one embodiment (to simplify the design), a scalar unit 808 and a vector unit 810 use separate register sets (respectively, scalar registers 812 and vector registers 814) and data transferred between them is written to memory and then read back in from a level 1 (L1) cache 806, alternative embodiments of the invention may use a different approach (e.g., use a single register set or include a communication path that allow data to be transferred between the two register files without being written and read back).

The local subset of the L2 cache 804 is part of a global L2 cache that is divided into separate local subsets, one per processor core. Each processor core has a direct access path to its own local subset of the L2 cache 804. Data read by a processor core is stored in its L2 cache subset 804 and can be accessed quickly, in parallel with other processor cores accessing their own local L2 cache subsets. Data written by a processor core is stored in its own L2 cache subset 804 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 8B is an expanded view of part of the processor core in FIG. 8A according to embodiments of the invention. FIG. 8B includes an L1 data cache 806A part of the L1 cache 804, as well as more detail regarding the vector unit 810 and the vector registers 814. Specifically, the vector unit 810 is a 16-wide vector processing unit (VPU) (see the 16-wide ALU 828), which executes one or more of integer, single-precision float, and double-precision float instructions. The VPU supports swizzling the register inputs with swizzle unit 820, numeric conversion with numeric convert units 822A-B, and replication with replication unit 824 on the memory input. Write mask registers 826 allow predicating resulting vector writes.

Processor With Integrated Memory Controller and Graphics

Figure 9:
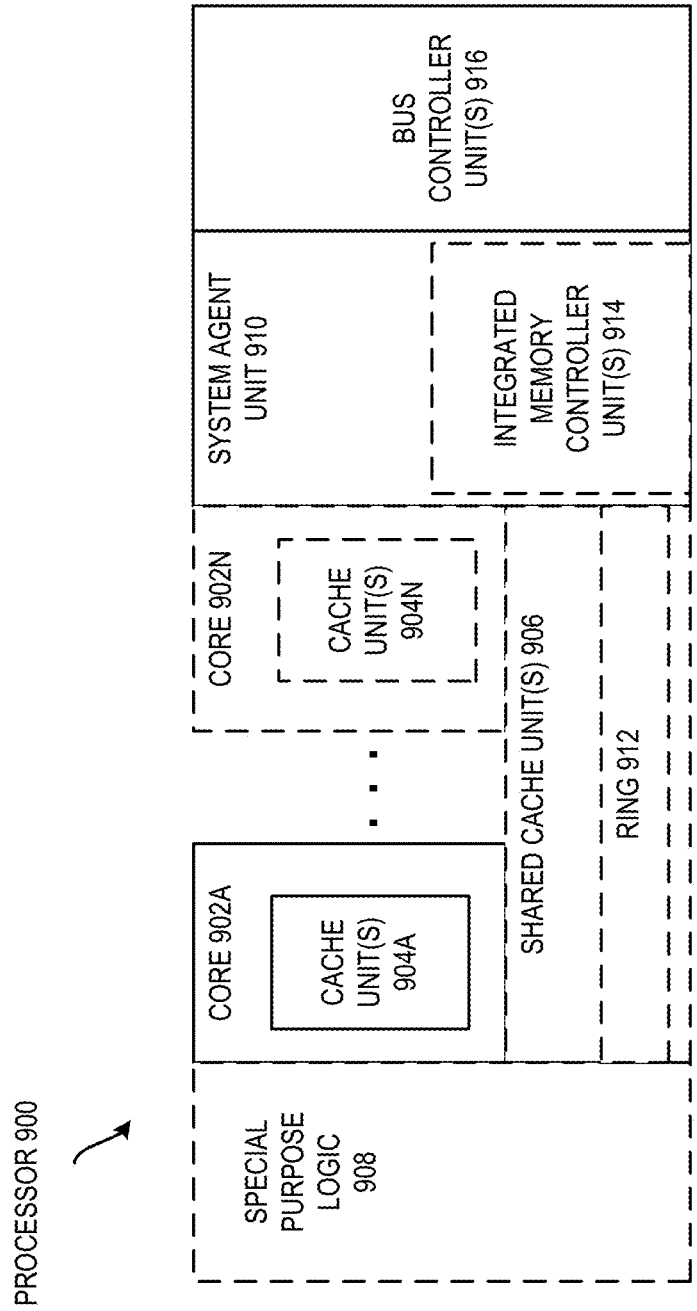
FIG. 9 is a block diagram of an embodiment of a processor that may have more than one core, may have an integrated memory controller, and may have integrated graphics.

FIG. 9 is a block diagram of a processor 900 that may have more than one core, may have an integrated memory controller, and may have integrated graphics according to embodiments of the invention. The solid lined boxes in FIG. 9 illustrate a processor 900 with a single core 902A, a system agent 910, a set of one or more bus controller units 916, while the optional addition of the dashed lined boxes illustrates an alternative processor 900 with multiple cores 902A-N, a set of one or more integrated memory controller unit(s) 914 in the system agent unit 910, and special purpose logic 908.

Thus, different implementations of the processor 900 may include: 1) a CPU with the special purpose logic 908 being integrated graphics and/or scientific (throughput) logic (which may include one or more cores), and the cores 902A-N being one or more general purpose cores (e.g., general purpose in-order cores, general purpose out-of-order cores, a combination of the two); 2) a coprocessor with the cores 902A-N being a large number of special purpose cores intended primarily for graphics and/or scientific (throughput); and 3) a coprocessor with the cores 902A-N being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof. While in one embodiment a ring based interconnect unit 912 interconnects the integrated graphics logic 908, the set of shared cache units 906, and the system agent unit 910/integrated memory controller unit(s) 914, alternative embodiments may use any number of well-known techniques for interconnecting such units. In one embodiment, coherency is maintained between one or more cache units 906 and cores 902A-N.

In some embodiments, one or more of the cores 902A-N are capable of multi-threading. The system agent 910 includes those components coordinating and operating cores 902A-N. The system agent unit 910 may include for example a power control unit (PCU) and a display unit. The PCU may be or include logic and components needed for regulating the power state of the cores 902A-N and the integrated graphics logic 908. The display unit is for driving one or more externally connected displays.

The cores 902A-N may be homogenous or heterogeneous in terms of architecture instruction set; that is, two or more of the cores 902A-N may be capable of execution the same instruction set, while others may be capable of executing only a subset of that instruction set or a different instruction set.

Exemplary Computer Architectures

FIGS. 10-13 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 10:
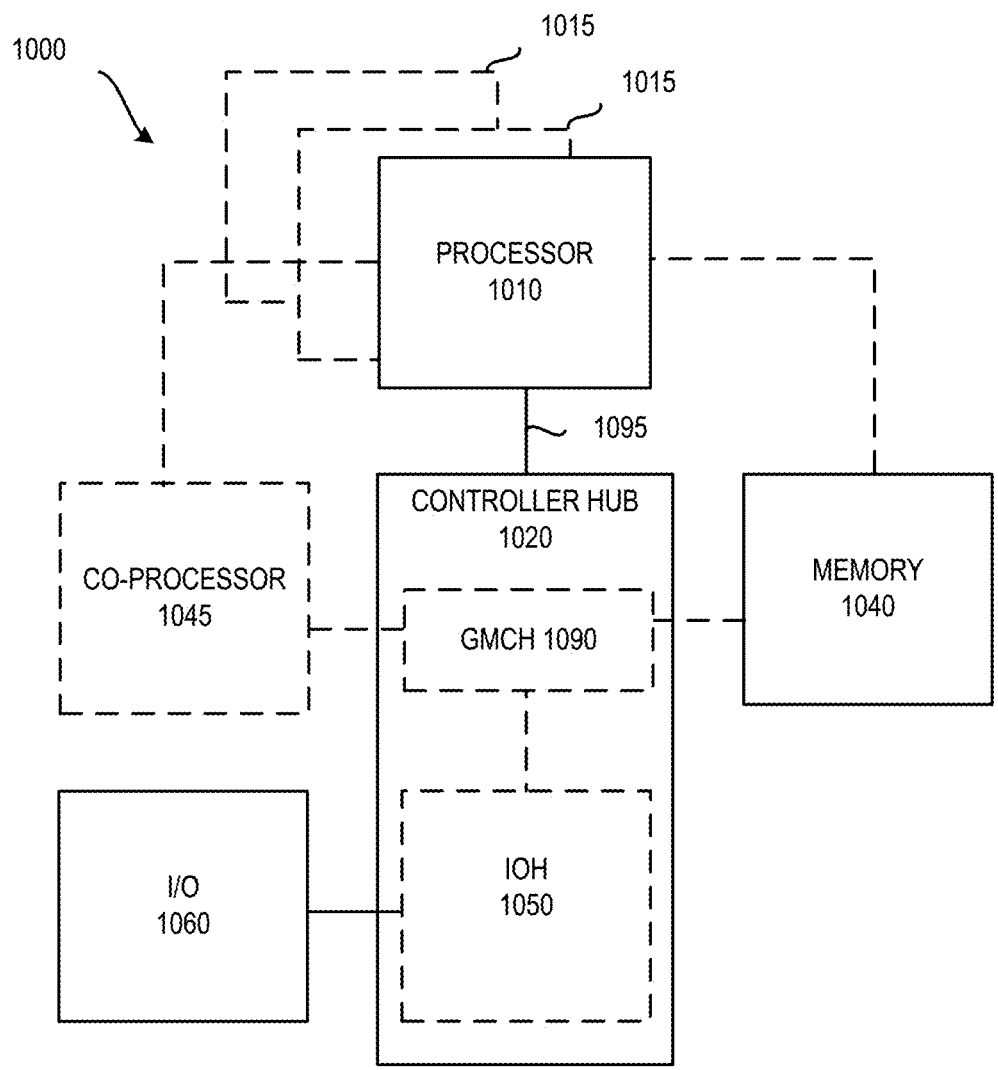
FIG. 10 is a block diagram of a first embodiment of a computer architecture.

Referring now to FIG. 10, shown is a block diagram of a system 1000 in accordance with one embodiment of the present invention. The system 1000 may include one or more processors 1010, 1015, which are coupled to a controller hub 1020. In one embodiment the controller hub 1020 includes a graphics memory controller hub (GMCH) 1090 and an Input/Output Hub (IOH) 1050 (which may be on separate chips); the GMCH 1090 includes memory and graphics controllers to which are coupled memory 1040 and a coprocessor 1045; the IOH 1050 is couples input/output (I/O) devices 1060 to the GMCH 1090. Alternatively, one or both of the memory and graphics controllers are integrated within the processor (as described herein), the memory 1040 and the coprocessor 1045 are coupled directly to the processor 1010, and the controller hub 1020 in a single chip with the IOH 1050.

The optional nature of additional processors 1015 is denoted in FIG. 10 with broken lines. Each processor 1010, 1015 may include one or more of the processing cores described herein and may be some version of the processor 900.

The memory 1040 may be, for example, dynamic random access memory (DRAM), phase change memory (PCM), or a combination of the two. For at least one embodiment, the controller hub 1020 communicates with the processor(s) 1010, 1015 via a multi-drop bus, such as a frontside bus (FSB), point-to-point interface such as QuickPath Interconnect (QPI), or similar connection 1095.

In one embodiment, the coprocessor 1045 is a special-purpose processor, such as, for example, a high-throughput MIC processor, a network or communication processor, compression engine, graphics processor, GPGPU, embedded processor, or the like. In one embodiment, controller hub 1020 may include an integrated graphics accelerator.

There can be a variety of differences between the physical resources 1010, 1015 in terms of a spectrum of metrics of merit including architectural, microarchitectural, thermal, power consumption characteristics, and the like.

In one embodiment, the processor 1010 executes instructions that control data processing operations of a general type. Embedded within the instructions may be coprocessor instructions. The processor 1010 recognizes these coprocessor instructions as being of a type that should be executed by the attached coprocessor 1045. Accordingly, the processor 1010 issues these coprocessor instructions (or control signals representing coprocessor instructions) on a coprocessor bus or other interconnect, to coprocessor 1045. Coprocessor(s) 1045 accept and execute the received coprocessor instructions.

Figure 11:
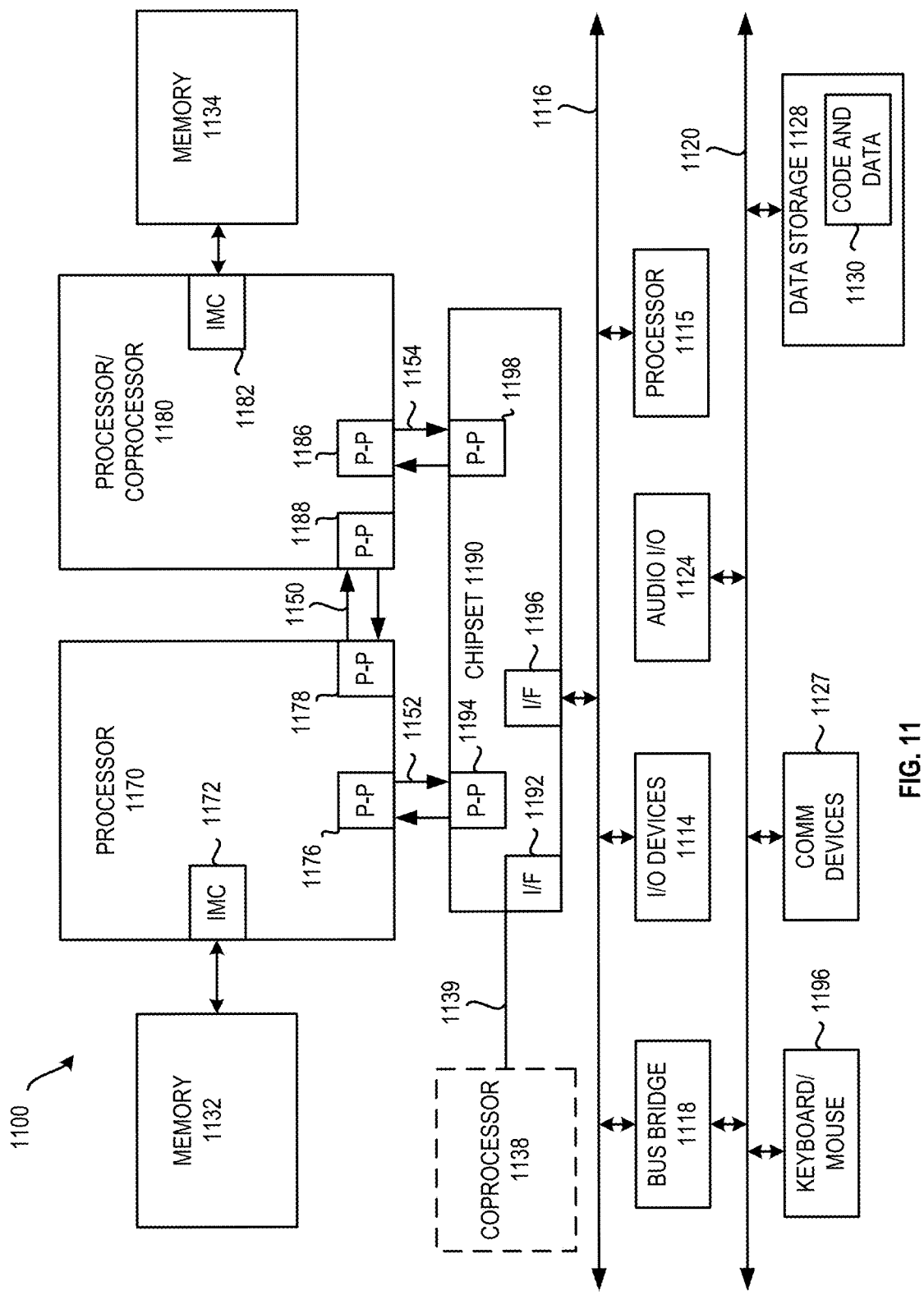
FIG. 11 is a block diagram of a second embodiment of a computer architecture.

Referring now to FIG. 11, shown is a block diagram of a first more specific exemplary system 1100 in accordance with an embodiment of the present invention. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of the processor 900. In one embodiment of the invention, processors 1170 and 1180 are respectively processors 1010 and 1015, while coprocessor 1138 is coprocessor 1045. In another embodiment, processors 1170 and 1180 are respectively processor 1010 coprocessor 1045.

Processors 1170 and 1180 are shown including integrated memory controller (IMC) units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may optionally exchange information with the coprocessor 1138 via a high-performance interface 1139. In one embodiment, the coprocessor 1138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present invention is not so limited.

As shown in FIG. 11, various I/O devices 1114 may be coupled to first bus 1116, along with a bus bridge 1118 which couples first bus 1116 to a second bus 1120. In one embodiment, one or more additional processor(s) 1115, such as coprocessors, high-throughput MIC processors, GPGPU's, accelerators (such as, e.g., graphics accelerators or digital signal processing (DSP) units), field programmable gate arrays, or any other processor, are coupled to first bus 1116. In one embodiment, second bus 1120 may be a low pin count (LPC) bus. Various devices may be coupled to a second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to the second bus 1120. Note that other architectures are possible. For example, instead of the point-to-point architecture of FIG. 11, a system may implement a multi-drop bus or other such architecture.

Figure 12:
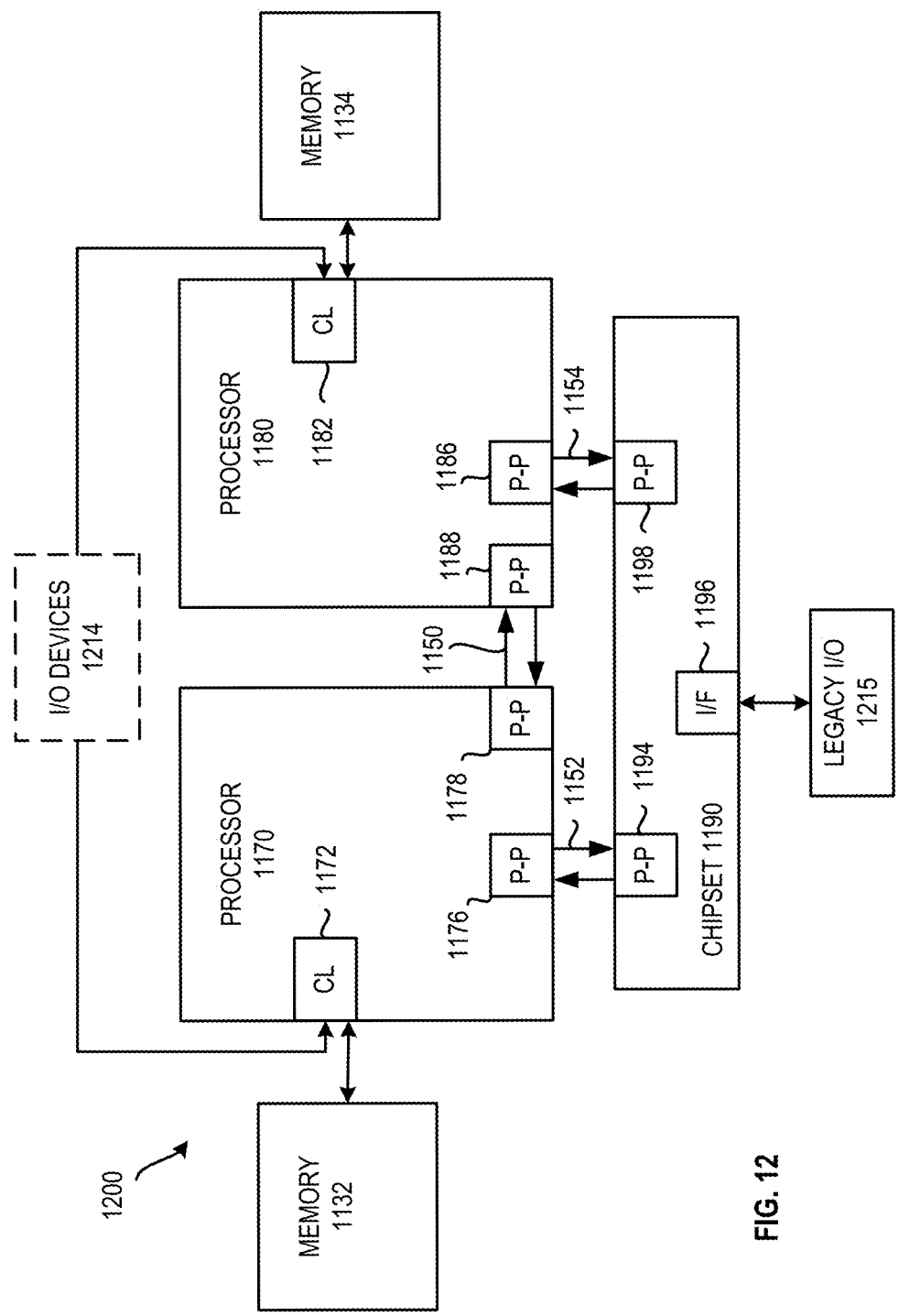
FIG. 12 is a block diagram of a third embodiment of a computer architecture.

Referring now to FIG. 12, shown is a block diagram of a second more specific exemplary system 1200 in accordance with an embodiment of the present invention. Like elements in FIGS. 11 and 12 bear like reference numerals, and certain aspects of FIG. 11 have been omitted from FIG. 12 in order to avoid obscuring other aspects of FIG. 12.

FIG. 12 illustrates that the processors 1170, 1180 may include integrated memory and I/O control logic ("CL") 1172 and 1182, respectively. Thus, the CL 1172, 1182 include integrated memory controller units and include I/O control logic. FIG. 12 illustrates that not only are the memories 1132, 1134 coupled to the CL 1172, 1182, but also that I/O devices 1214 are also coupled to the control logic 1172, 1182. Legacy I/O devices 1215 are coupled to the chipset 1190.

Figure 13:
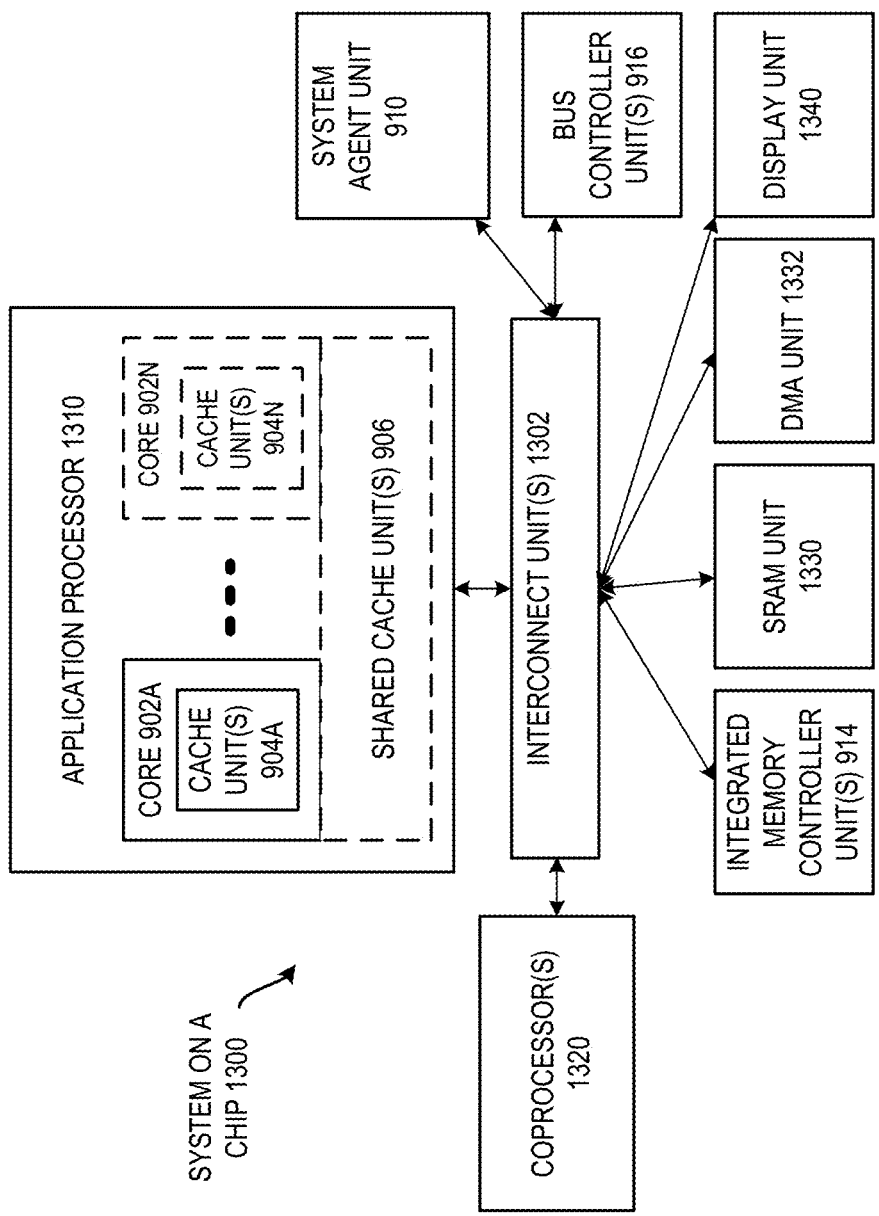
FIG. 13 is a block diagram of an embodiment of a system-on-a-chip architecture.

Referring now to FIG. 13, shown is a block diagram of a SoC 1300 in accordance with an embodiment of the present invention. Similar elements in FIG. 9 bear like reference numerals. Also, dashed lined boxes are optional features on more advanced SoCs. In FIG. 13, an interconnect unit(s) 1302 is coupled to: an application processor 1310 which includes a set of one or more cores 202A-N and shared cache unit(s) 906; a system agent unit 910; a bus controller unit(s) 916; an integrated memory controller unit(s) 914; a set or one or more coprocessors 1320 which may include integrated graphics logic, an image processor, an audio processor, and a video processor; an static random access memory (SRAM) unit 1330; a direct memory access (DMA) unit 1332; and a display unit 1340 for coupling to one or more external displays. In one embodiment, the coprocessor(s) 1320 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1130 illustrated in FIG. 11, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 14:
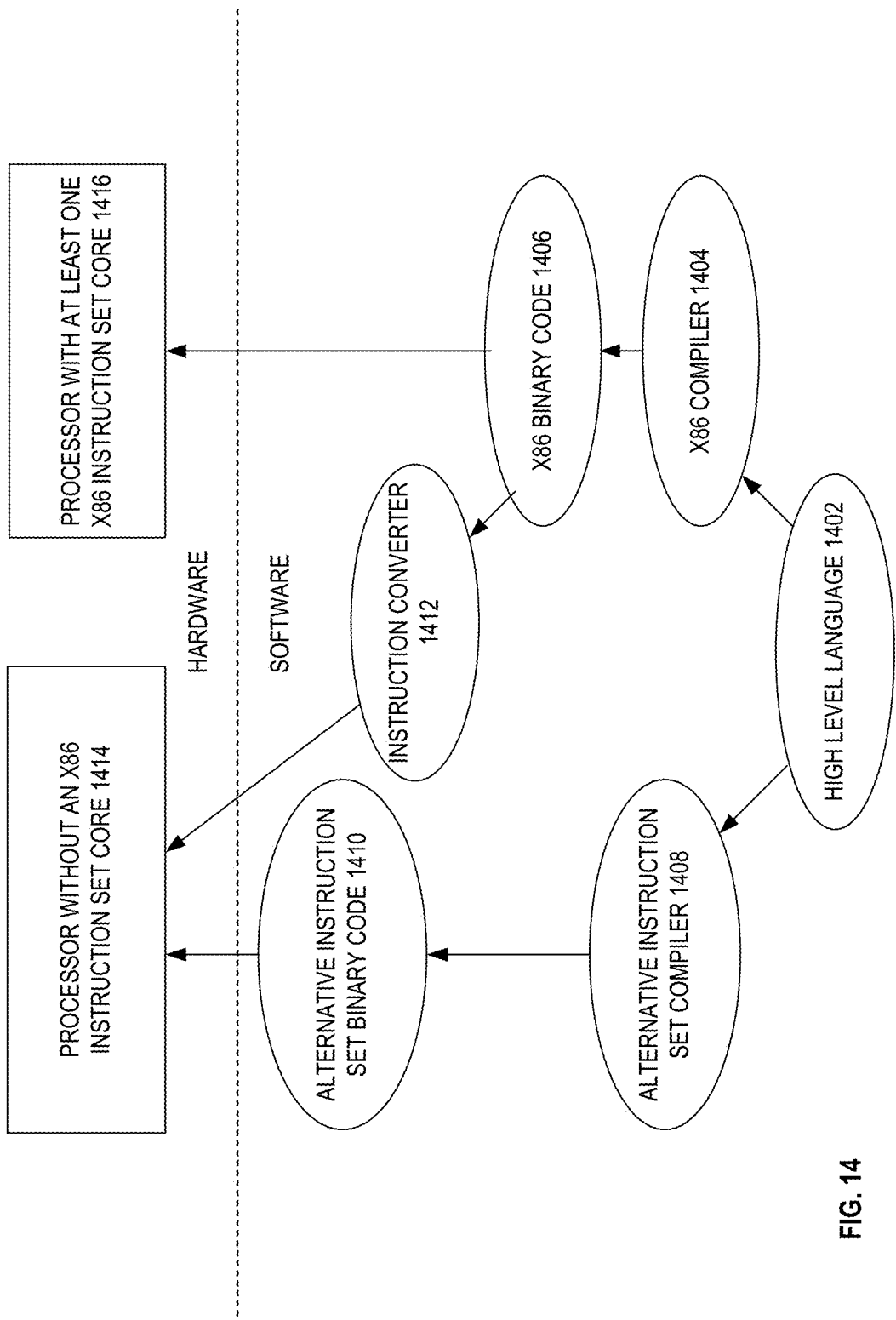
FIG. 14 is a block diagram of use of a software instruction converter to convert binary instructions in a source instruction set to binary instructions in a target instruction set, according to embodiments of the invention.

FIG. 14 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 14 shows a program in a high level language 1402 may be compiled using an x86 compiler 1404 to generate x86 binary code 1406 that may be natively executed by a processor with at least one x86 instruction set core 1416. The processor with at least one x86 instruction set core 1416 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1404 represents a compiler that is operable to generate x86 binary code 1406 (e.g., object code) that can, with or without additional linkage processing, be executed on the processor with at least one x86 instruction set core 1416. Similarly, FIG. 14 shows the program in the high level language 1402 may be compiled using an alternative instruction set compiler 1408 to generate alternative instruction set binary code 1410 that may be natively executed by a processor without at least one x86 instruction set core 1414 (e.g., a processor with cores that execute the MIPS instruction set of MIPS Technologies of Sunnyvale, CA and/or that execute the ARM instruction set of ARM Holdings of Sunnyvale, CA). The instruction converter 1412 is used to convert the x86 binary code 1406 into code that may be natively executed by the processor without an x86 instruction set core 1414. This converted code is not likely to be the same as the alternative instruction set binary code 1410 because an instruction converter capable of this is difficult to make; however, the converted code will accomplish the general operation and be made up of instructions from the alternative instruction set. Thus, the instruction converter 1412 represents software, firmware, hardware, or a combination thereof that, through emulation, simulation or any other process, allows a processor or other electronic device that does not have an x86 instruction set processor or core to execute the x86 binary code 1406.

Components, features, and details described for any of FIGS. 1, 4, 5, 6 may also optionally apply to any of FIGS. 2-3. Components, features, and details described for any of the processors disclosed herein may optionally apply to any of the methods disclosed herein, which in embodiments may optionally be performed by and/or with such processors. Any of the processors described herein in embodiments may optionally be included in any of the systems disclosed herein (e.g., any of FIGS. 10-13). Any of the instructions disclosed herein in embodiments may optionally be performed by and/or with any of the processors disclosed herein, optionally in some embodiments having any of the microarchitectures shown herein, and optionally in some embodiments included in any of the systems shown herein.

In the description and claims, the terms "coupled" and/or "connected," along with their derivatives, may have been used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with a register and/or a decode unit through one or more intervening components. In the figures, arrows are used to show connections and couplings.

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Certain operations may be performed by hardware components, or may be embodied in machine-executable or circuit-executable instructions, that may be used to cause and/or result in a machine, circuit, or hardware component (e.g., a processor, portion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operative to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operative to cause the machine to perform and/or result in the machine performing one or operations, methods, or techniques disclosed herein.

In some embodiments, the machine-readable medium may include a tangible and/or non-transitory machine-readable storage medium. For example, the non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal. In some embodiments, the storage medium may include a tangible medium that includes solid-state matter or material, such as, for example, a semiconductor material, a phase change material, a magnetic solid material, a solid data storage material, etc. Alternatively, a non-tangible transitory computer-readable transmission media, such as, for example, an electrical, optical, acoustical or other form of propagated signals—such as carrier waves, infrared signals, and digital signals, may optionally be used.

Examples of suitable machines include, but are not limited to, a general-purpose processor, a special-purpose processor, a digital logic circuit, an integrated circuit, or the like. Still other examples of suitable machines include a computer system or other electronic device that includes a processor, a digital logic circuit, or an integrated circuit. Examples of such computer systems or electronic devices include, but are not limited to, desktop computers, laptop computers, notebook computers, tablet computers, netbooks, smartphones, cellular phones, servers, network devices (e.g., routers and switches), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

EXAMPLE EMBODIMENTS

The following examples pertain to further embodiments. Specifics in the examples may be used anywhere in one or more embodiments.

Example 1 is a processor including a widest set of data registers corresponding to a given logical processor. Each of the data registers of the widest set having a first width in bits. The processor also includes a decode unit corresponding to the given logical processor to decode instructions that specify the data registers of the widest set, and to decode an atomic store to memory instruction. The atomic store to memory instruction is to indicate data that is to have a second width in bits that is wider than the first width in bits of each of the data registers of the widest set. The atomic store to memory instruction to indicate memory address information associated with a memory location. The processor also has an execution unit coupled with the decode unit. The execution unit, in response to the atomic store to memory instruction, to atomically store the indicated data to the memory location.

Example 2 includes the processor of Example 1, in which the execution unit includes a staging buffer, and wherein the execution unit, in response to the instruction, is to sequentially store a plurality of portions that are to collectively represent a total amount of the indicated data to the staging buffer, and concurrently store the total amount of the indicated data from the staging buffer after the total amount of the indicated data has been stored in the staging buffer.

Example 3 includes the processor of Example 2, further comprising a write combining buffer, and wherein the execution unit, in response to the atomic store to memory instruction, is to concurrently store the total amount of the indicated data from the staging buffer to the write combining buffer.

Example 4 includes the processor of Example 3, in which the execution unit, in response to the atomic store to memory instruction, is to configure the write combining buffer for eviction after the plurality of portions of the indicated data have been stored to the write combining buffer.

Example 5 includes the processor of any one of Examples 3 to 4, in which the execution unit, in response to the atomic store to memory instruction, is to configure the write combining buffer to not allow a younger store operation to merge with the write combining buffer after the plurality of portions of the indicated data have been stored to the write combining buffer.

Example 6 includes the processor of any one of Examples 1 to 5, in which the execution unit, in response to the atomic store to memory instruction, is to signal one of a breakpoint configured on, a segment limit violation for, a canonical address form violation for, and a range based violation for, any bytes from a first byte to a last byte of the memory location where the data is to be atomically stored, when the atomic store to memory instruction retires.

Example 7 includes the processor of any one of Examples 1 to 6, in which the execution unit, in response to the atomic store to memory instruction, is to make the atomic store of the data non-forwardable and is to force a memory type associated with the atomically stored data to be uncacheable speculative write combining (USWC) irrespective of an underlying memory type.

Example 8 includes the processor of any one of Examples 1 to 7, in which the first and second widths are one of: (1) the first width is 128-bits and the second width is 256-bits; (2) the first width is 128-bits and the second width is 512-bits; (3) the first width is 128-bits and the second width is 1024-bits; (4) the first width is 256-bits and the second width is 512-bits; and (5) the first width is 256-bits and the second width is 1024-bits.

Example 9 includes the processor of any one of Examples 1 to 8, in which the decode unit is to decode the atomic store to memory instruction that is to indicate second memory address information associated with a second different memory location from where the indicated data is to be loaded in response to the atomic store to memory instruction.

Example 10 includes the processor of any one of Examples 1 to 8, in which the decode unit is to decode the atomic store to memory instruction that is to indicate a plurality of the data registers of the widest set that are initially to be used to store the indicated data.

Example 11 includes the processor of any one of Examples 1 to 10, further including a retire unit. Also, optionally in which the retire unit is to wait to retire the atomic store to memory instruction until receipt of a response. Also, optionally in which the response is to indicate whether the data that is to have been atomically stored to the memory location, has been fully observed and is now coherent.

Example 12 includes the processor of any one of Examples 1 to 11, in which the second width is wider than a width in bits of a widest operation, which is one of an arithmetic operation, a logical operation, and an arithmetic and logical operation, that the given logical processor is able to perform on one or more packed data operands.

Example 13 includes the processor of any one of Examples 1 to 12, in which the second width is wider than a width in bits of a widest packed data operand that to be indicated by any one of any packed data add instructions that the decode unit is to decode and any packed data multiply instructions that the decode unit is to decode.

Example 14 is a method performed by a processor including receiving an atomic store to memory instruction at a given logical processor of the processor. The atomic store to memory instruction indicating data that is wider in bits than a widest data register that instructions of an instruction set of the given logical processor are able to specify, and the atomic store to memory instruction indicating memory address information associated with a memory location. The method also includes atomically storing the indicated data to the memory location, in response to the atomic store to memory instruction.

Example 15 includes the method of Example 14, in which said atomically storing includes atomically storing the indicated data having a width of at least 512-bits to the memory location, and in which a width of the widest data register is no more than 256-bits.

Example 16 includes the method of any one of Examples 14 to 15, in which said atomically storing further includes, in response to the atomic store to memory instruction sequentially storing a plurality of portions collectively representing a total amount of the indicated data to a staging buffer. Also, optionally concurrently storing the plurality of portions of the indicated data and/or the total amount of the indicated data from the staging buffer to another storage location.

Example 17 includes the method of Example 16, in which said concurrently storing comprises concurrently storing the total amount of the indicated data from the staging buffer to a write combining buffer, and in which said atomically storing further includes, in response to the atomic store to memory instruction configuring the write combining buffer to not allow a younger store operation to merge with the write combining buffer after the plurality of portions of the indicated data have been stored to the write combining buffer. Also, optionally configuring the write combining buffer for eviction after the plurality of portions of the indicated data have been stored to the write combining buffer.

Example 18 includes the method of any one of Examples 14 to 17, in which said atomically storing the indicated data to the memory location is used to assign work to an accelerator device.

Example 19 includes the method of any one of Examples 14 to 18, further including detecting and signaling one of a breakpoint, a segment limit violation, and a range based violation, on any bytes of the memory location when the data is atomically stored, when the atomic store to memory instruction commits.

Example 20 includes the method of any one of Examples 14 to 19, in which said receiving includes receiving the atomic store to memory instruction that indicates memory address information associated with a second memory location from where the indicated data is loaded in response to the atomic store to memory instruction.

Example 21 is a computer system including an interconnect, and a processor coupled with the interconnect. The processor having a given core having a widest set of data registers. Each of the data registers of the widest set having a first width in bits. The given core to receive an atomic store to memory instruction that is to indicate data that is to have a second width in bits that is wider than the first width of each of the data registers of the widest set. The atomic store to memory instruction to indicate memory address information associated with a memory location, the processor, in response to the atomic store to memory instruction, to atomically store the indicated data to the memory location. The computer system also includes a dynamic random access memory (DRAM) coupled with the interconnect. The DRAM storing a set of instructions to use different instances of the atomic store to memory instruction to submit work to another device.

Example 22 includes the computer system of Example 21, in which the processor includes a staging buffer, and a write combining buffer, and in which the processor, in response to the atomic store to memory instruction, is to sequentially store a plurality of portions of the indicated data to the staging buffer. Also, optionally to store the plurality of portions of the indicated data from the staging buffer to the write combining buffer.

Example 23 includes the computer system of any one of Examples 21 to 22, in which the first width is no more than 256-bits, and the second width is at least 512-bits.

Example 24 is an article of manufacture including a non-transitory machine-readable storage medium. The non-transitory machine-readable storage medium storing an atomic store to memory instruction. The atomic store to memory instruction, if performed by a processor, to cause the processor to perform operations including receive the atomic store to memory instruction at a given logical processor of the processor. The atomic store to memory instruction to indicate data that is to have a wider width in bits than a width in bits of a widest arithmetic operation that the given logical processor is able to perform, and the atomic store to memory instruction to indicate memory address information associated with a memory location. The operations further include to atomically store the data to the memory location.

Example 25 includes the article of manufacture of Example 24, in which the width of the data is to be at least 512-bits, and in which the width of the widest arithmetic operation is to be no more than 256-bits.

Example 26 includes the processor of any one of Examples 1 to 13, further including an optional branch prediction unit to predict branches, and an optional instruction prefetch unit, coupled with the branch prediction unit, the instruction prefetch unit to prefetch instructions including the atomic store to memory instruction. The processor may also optionally include an optional level 1 (L1) instruction cache coupled with the instruction prefetch unit, the L1 instruction cache to store instructions, an optional L1 data cache to store data, and an optional level 2 (L2) cache to store data and instructions. The processor may also optionally include an instruction fetch unit coupled with the decode unit, the L1 instruction cache, and the L2 cache, to fetch the atomic store to memory instruction, in some cases from one of the L1 instruction cache and the L2 cache, and to provide the atomic store to memory instruction to the decode unit. The processor may also optionally include a register rename unit to rename registers, an optional scheduler to schedule one or more operations that have been decoded from the atomic store to memory instruction for execution, and an optional commit unit to commit execution results of the atomic store to memory instruction.

Example 27 includes a system-on-chip that includes at least one interconnect, the processor of any one of Examples 1 to 13 coupled with the at least one interconnect, an optional graphics processing unit (GPU) coupled with the at least one interconnect, an optional digital signal processor (DSP) coupled with the at least one interconnect, an optional display controller coupled with the at least one interconnect, an optional memory controller coupled with the at least one interconnect, an optional wireless modem coupled with the at least one interconnect, an optional image signal processor coupled with the at least one interconnect, an optional Universal Serial Bus (USB) 3.0 compatible controller coupled with the at least one interconnect, an optional Bluetooth 4.1 compatible controller coupled with the at least one interconnect, and an optional wireless transceiver controller coupled with the at least one interconnect.

Example 28 is a processor or other apparatus operative to perform the method of any one of Examples 14 to 20.

Example 29 is a processor or other apparatus that includes means for performing the method of any one of Examples 14 to 20.

Example 30 is a processor or other apparatus that includes any combination of modules and/or units and/or logic and/or circuitry and/or means operative to perform the method of any one of Examples 14 to 20.

Example 31 is an optionally non-transitory and/or tangible machine-readable medium, which optionally stores or otherwise provides instructions including a first instruction, the first instruction if and/or when executed by a processor, computer system, electronic device, or other machine, is operative to cause the machine to perform the method of any one of Examples 14 to 20.

Example 32 is a processor or other apparatus substantially as described herein.

Example 33 is a processor or other apparatus that is operative to perform any method substantially as described herein.

Example 34 is a processor or other apparatus that is operative to perform any atomic store to memory instruction to atomically store data wider than a natively supported with of a processor substantially as described herein.

Example 35 is a computer system or other electronic device that includes a processor having a decode unit operative to decode instructions of a first instruction set. The processor also has one or more execution units. The electronic device also includes a storage device coupled with the processor. The storage device is operative to store a first instruction, which may be any of the instructions substantially as disclosed herein, and which is to be of a second different instruction set. The storage device is also operative to store instructions to convert the first instruction into one or more instructions of the first instruction set. The one or more instructions of the first instruction set, when performed by the processor, are operative to cause the processor to atomically store data wider than a natively supported width of a processor to memory.

Example 36 is processor comprising a decode unit corresponding to a given logical processor. The decode unit to decode an atomic store to memory instruction. The atomic store to memory instruction to indicate data, and the atomic store to memory instruction to indicate memory address information associated with a memory location. The processor also includes an execution unit coupled with the decode unit. The execution unit, in response to the atomic store to memory instruction, to atomically store the indicated data to the memory location. A width in bits of the data that is to be atomically stored in response to the atomic store to memory instruction is to be wider than a width in bits of data to be atomically loaded by any instruction the decoder is able to decode.

What is claimed is:

1. A processor comprising:
    a plurality of caches;
    decode circuitry to decode an instruction, the instruction indicating first information to reference a source memory location and second information to reference a destination memory location, wherein the instruction to indicate the second information is to indicate a general-purpose register, the general-purpose register to store relative memory address information to be combined with information from a segment register to address the destination memory location; and
    execution circuitry coupled with the decode circuitry, the execution circuitry to perform operations corresponding to the instruction, including to:
        load 512 bits of data from the source memory location; and
        atomically store the 512 bits of data to the destination memory location.

2. The processor of claim 1, wherein successful completion of the atomic store requires the destination memory location to be 64-byte aligned.

3. The processor of claim 1, wherein the execution circuitry is to bypass the plurality of caches when atomically storing the 512 bits of data to the destination memory location.

4. The processor of claim 1, wherein the execution circuitry is to use a write combining memory type when atomically storing the 512 bits of data irrespective of a memory type of the destination memory location.

5. The processor of claim 1, wherein the execution circuitry, to perform the operations corresponding to the instruction, is to:
    make the 512 bits of data ready for immediate eviction from a write-combining buffer; and
    prevent data of a store instruction younger than the instruction from merging with the 512 bits of data in the write-combining buffer.

6. The processor of claim 1, wherein the instruction is a work submission instruction to submit work to the destination memory location in a memory space of an accelerator.

7. The processor of claim 1, wherein successful completion of the atomic store requires the destination memory location to be 64-byte aligned, wherein the execution circuitry is to bypass the plurality of caches when atomically storing the 512 bits of data to the destination memory location, and wherein the execution circuitry is to use a write combining memory type when atomically storing the 512 bits of data irrespective of a memory type of the destination memory location.

8. The processor of claim 1, wherein the execution circuitry, to atomically store the 512 bits of data to the destination memory location, is to store the 512 bits of data to a work submission queue for an accelerator, wherein the execution circuitry, to load the 512 bits of data from the source memory location, is to sequentially load a plurality of portions of the 512 bits of data, and wherein the execution circuitry, to perform the operations corresponding to the instruction, is to:

make the 512 bits of data ready for immediate eviction from a write-combining buffer; and prevent data of a store instruction younger than the instruction from merging with the 512 bits of data in the write-combining buffer.

9. A processor comprising:

a plurality of caches;

decode circuitry to decode an instruction, the instruction indicating first information to reference a source memory location and second information to reference a destination memory location; and execution circuitry coupled with the decode circuitry, the execution circuitry to perform operations corresponding to the instruction, including to:

load 512 bits of data from the source memory location; and atomically store the 512 bits of data to the destination memory location, wherein the execution circuitry, to said atomically store the 512 bits of data to the destination memory location, is to store the 512 bits of data to a work submission queue for an accelerator.

10. The processor of claim 9, wherein the instruction to indicate the second information is to indicate a general-purpose register, the general-purpose register to store relative memory address information to be combined with information from a segment register to address the destination memory location.

11. The processor of claim 9, wherein the execution circuitry, to load the 512 bits of data from the source memory location, is to sequentially load a plurality of portions of the 512 bits of data.

12. The processor of claim 9, wherein the instruction to indicate the second information is to indicate a general-purpose register, the general-purpose register to store relative memory address information to be combined with information from a segment register to address the destination memory location, and wherein the execution circuitry, to perform the operations corresponding to the instruction, is to:

make the 512 bits of data ready for immediate eviction from a write-combining buffer; and prevent data of a store instruction younger than the instruction from merging with the 512 bits of data in the write-combining buffer.

13. A system comprising:

a system memory;

a mass storage device coupled with the system memory; and a processor coupled with the system memory, the processor comprising:

a plurality of caches;

decode circuitry to decode an instruction, the instruction indicating first information to reference a source memory location and second information to reference a destination memory location; and execution circuitry coupled with the decode circuitry, the execution circuitry to perform operations corresponding to the instruction, including to:

load 512 bits of data from the source memory location; and atomically store the 512 bits of data to the destination memory location, wherein the instruction is to indicate a general-purpose register which is to store relative memory address information as the second information, the relative memory address information to be combined with information from a segment register to address the destination memory location, and wherein the execution circuitry, to atomically store the 512 bits of data to the destination memory location, is to store the 512 bits of data to a work submission queue for an accelerator.

14. The system of claim 13, wherein the system memory comprises a dynamic random access memory (DRAM), wherein successful completion of the atomic store requires the destination memory location to be 64-byte aligned, and wherein the execution circuitry is to bypass the plurality of caches when atomically storing the 512 bits of data to the destination memory location.

15. The system of claim 13, further comprising an input/output device coupled with the system memory, wherein the execution circuitry is to use a write combining memory type when atomically storing the 512 bits of data irrespective of a memory type of the destination memory location, and wherein the execution circuitry, to perform the operations corresponding to the instruction, is to:

make the 512 bits of data ready for immediate eviction from a write-combining buffer; and prevent data of a store instruction younger than the instruction from merging with the 512 bits of data in the write-combining buffer.

16. A processor comprising:

a plurality of caches;

decode circuitry to decode an atomic store to memory instruction, the atomic store to memory instruction having fields to specify a first 64-bit register and a second 64-bit register, wherein the first 64-bit register is a first of eight sequential 64-bit registers, the eight sequential 64-bit registers to collectively store a 512-bit data, and wherein the second 64-bit register is to store memory address information corresponding to a memory location; and execution circuitry coupled with the decode circuitry, the execution circuitry to execute the decoded atomic store to memory instruction, to:

atomically store the 512-bit data to the memory location, bypassing the plurality of caches, wherein successful completion of the atomic store requires the memory location to be 64-byte aligned.

17. The processor of claim 16, wherein, to execute the decoded atomic store to memory instruction, the execution circuitry is to:

sequentially store different 64-bit portions of the 512-bit data from the eight sequential 64-bit registers to a storage location; and concurrently store the 512-bit data from the storage location to the memory location.

18. The processor of claim 17, wherein, to sequentially store the different 64-bit portions of the 512-bit data from the eight sequential 64-bit registers to the storage location, the execution circuitry is to sequentially store the different 64-bit portions of the 512-bit data to different 64-bit portions of the storage location, the different 64-bit portions of the storage location indicated by respective indices.

19. The processor of claim 16, wherein the atomic store to memory instruction is an accelerator work submission instruction.

20. The processor of claim 16, wherein a memory type of the memory location is an uncacheable memory type.

21. The processor of claim 16, wherein the execution circuitry is to atomically store the 512-bit data to the memory location via an uncacheable store operation.

* * * * *